United States Patent
Hirata et al.

(10) Patent No.: US 7,650,956 B2
(45) Date of Patent: Jan. 26, 2010

(54) VEHICLE DRIVE CONTROL APPARATUS AND METHOD

(75) Inventors: Takeshi Hirata, Kanagawa (JP); Tsuyoshi Yamanaka, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 445 days.

(21) Appl. No.: 11/445,207

(22) Filed: Jun. 2, 2006

(65) Prior Publication Data

US 2006/0276289 A1    Dec. 7, 2006

(30) Foreign Application Priority Data

Jun. 3, 2005   (JP)   ............................ 2005-164836

(51) Int. Cl.
*B60K 17/344*   (2006.01)
(52) U.S. Cl. ................. 180/248; 180/249; 180/250; 477/5; 477/6
(58) Field of Classification Search .......... 180/248, 180/249, 250; 477/5, 6
See application file for complete search history.

(56) References Cited

U.S. PATENT DOCUMENTS

| | | | | |
|---|---|---|---|---|
| 5,856,709 A | * | 1/1999 | Ibaraki et al. | 290/45 |
| 5,902,205 A | * | 5/1999 | Williams | 475/204 |
| 6,107,761 A | * | 8/2000 | Seto et al. | 318/139 |
| 6,176,808 B1 | * | 1/2001 | Brown et al. | 477/5 |
| 6,569,055 B2 | * | 5/2003 | Urasawa et al. | 477/5 |
| 6,615,940 B2 | * | 9/2003 | Morisawa | 180/65.1 |
| 6,852,053 B2 | | 2/2005 | Nakano et al. | |
| 7,163,480 B2 | * | 1/2007 | Supina et al. | 475/5 |
| 2002/0107101 A1 | * | 8/2002 | Bowen et al. | 475/5 |
| 2004/0077448 A1 | | 4/2004 | Oshidari et al. | |
| 2004/0204278 A1 | | 10/2004 | Olsson | |

FOREIGN PATENT DOCUMENTS

| | | |
|---|---|---|
| DE | 37 11 913 A1 | 10/1988 |
| EP | 1 279 545 A2 | 1/2003 |
| EP | 1 396 369 A2 | 3/2004 |
| GB | 2 204 368 A | 11/1988 |
| JP | 50-085019 A | 7/1975 |
| JP | 60-176828 A | 9/1985 |
| JP | 2000-166004 A | 6/2000 |
| JP | 2003-32808 | 1/2003 |
| JP | 2004-150627 | 5/2004 |
| JP | 2004-225871 A | 8/2004 |
| JP | 2005-127411 A | 5/2005 |
| WO | WO 97/01051 A1 | 1/1997 |

* cited by examiner

*Primary Examiner*—Lesley D. Morris
*Assistant Examiner*—Maurice Williams
(74) *Attorney, Agent, or Firm*—Foley & Lardner LLP

(57) ABSTRACT

A vehicle drive control for a wheeled vehicle including a first motor generator, and a second motor generator. A planetary gear set includes a first rotating element connected to the first motor generator, a second rotating element connected to the second motor generator, and a third rotating element connected to a drive wheel. A rotation control mechanism selectively restricts rotation of one of the first and second rotating elements of the planetary gear set to establish a fixed speed ratio mode, and releases the one of the first and second rotating elements to establish a variable speed ratio mode. A control unit is configured to control each operating state of the rotation control mechanism, the first motor generator, and the second motor generator, and configured to establish the variable speed ratio mode when a slip state of the drive wheel is detected in the fixed speed ratio mode.

9 Claims, 14 Drawing Sheets

EV-LOW MODE

EV-LOW-iVT MODE

EV-2ND MODE

EV-HIGH-iVT MODE

EV-HIGH MODE

HEV-LOW MODE

HEV-LOW-iVT MODE

HEV-2ND MODE

HEV-HIGH-iVT MODE

HEV-HIGH MODE

|  |  | BINARY (0:OFF, 1:ON) | | | | | | | |
|---|---|---|---|---|---|---|---|---|---|
|  |  | E | EC | M | LB | HC | HLB | SC | MGC |
| EV | LOW | 0 | 0 | 1 | 1 | 0 | 1 | 0 | 1 |
|  | LOW-iVT | 0 | 0 | 1 | 1 | 0 | 0 | 0 | 1 |
|  | 2ND | 0 | 0 | 1 | 1 | 1 | 0 | 0 | 1 |
|  | HIGH-iVT | 0 | 0 | 1 | 0 | 1 | 0 | 0 | 1 |
|  | HIGH | 0 | 0 | 1 | 0 | 1 | 1 | 0 | 1 |
| HEV | LOW | 1 | 1 | 1 | 1 | 0 | 1 | 0 | 1 |
|  | LOW-iVT | 1 | 1 | 1 | 1 | 0 | 0 | 0 | 1 |
|  | 2ND | 1 | 1 | 1 | 1 | 1 | 0 | 0 | 1 |
|  | HIGH-iVT | 1 | 1 | 1 | 0 | 1 | 0 | 0 | 1 |
|  | HIGH | 1 | 1 | 1 | 0 | 1 | 1 | 0 | 1 |
| S-LOW |  | 1 | 0 | 1 | 1 | 0 | 1 | 1 | 0 |

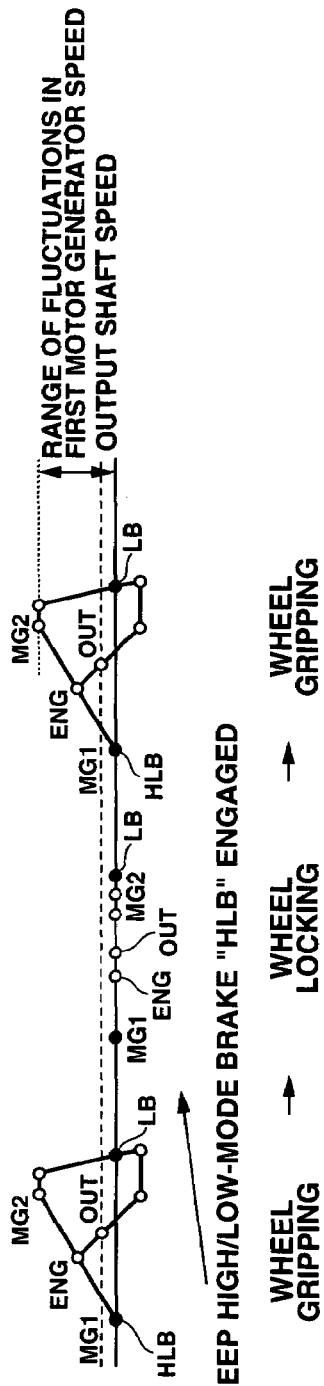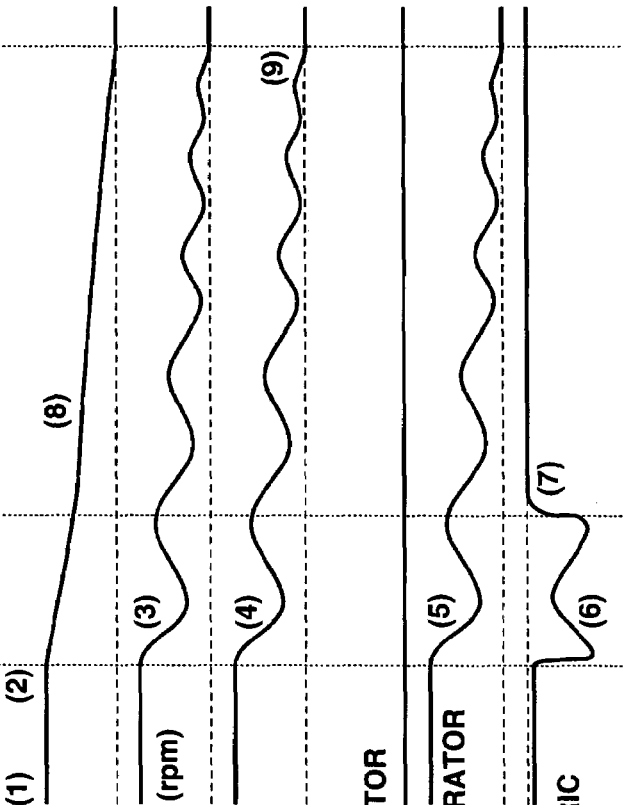

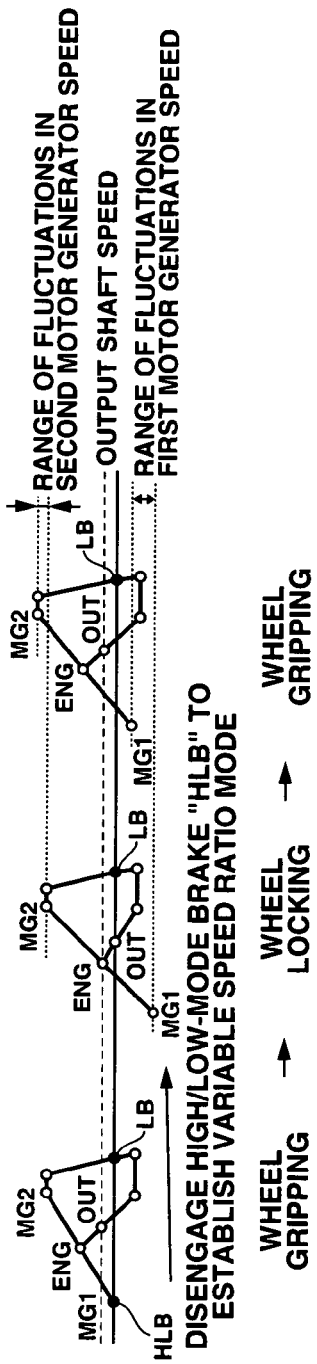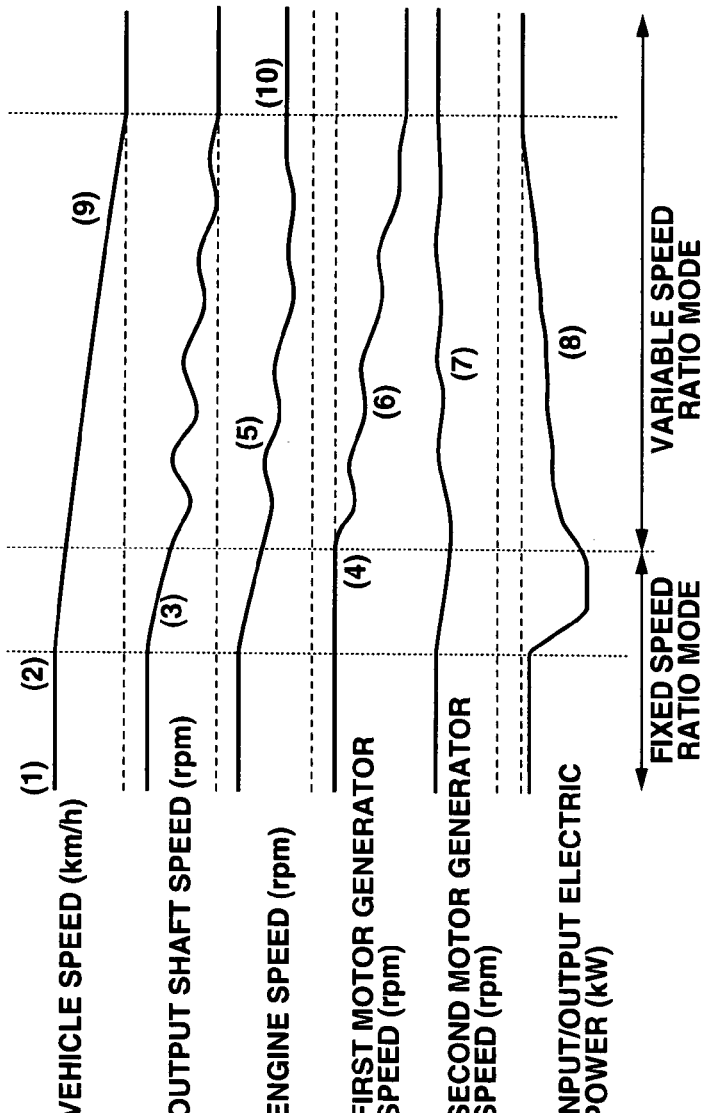

FIG.12A  FIG.12B  FIG.12C
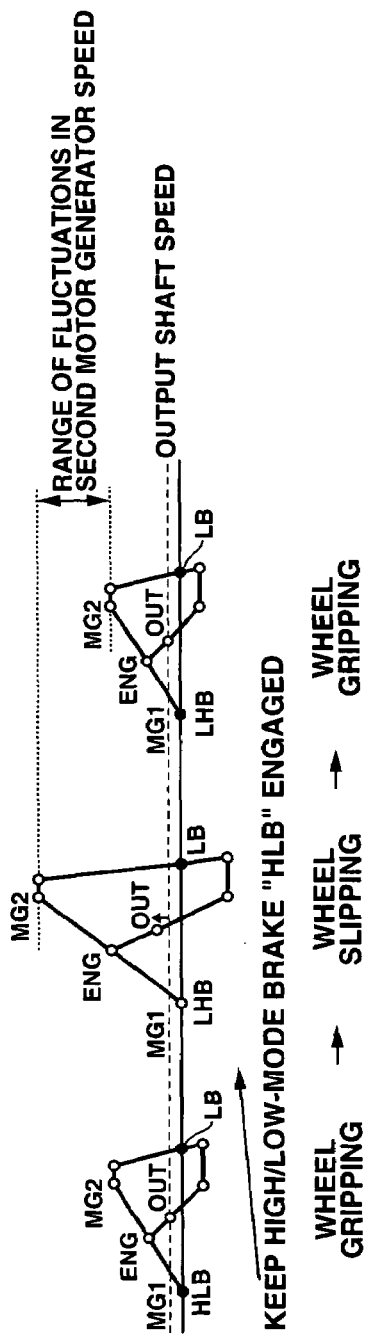
FIG.13A VEHICLE SPEED (km/h) (1)
FIG.13B OUTPUT SHAFT SPEED (rpm)
FIG.13C ENGINE SPEED (rpm)
FIG.13D FIRST MOTOR GENERATOR SPEED (rpm)
FIG.13E SECOND MOTOR GENERATOR SPEED (rpm)
FIG.13F INPUT/OUTPUT ELECTRIC POWER (kW)
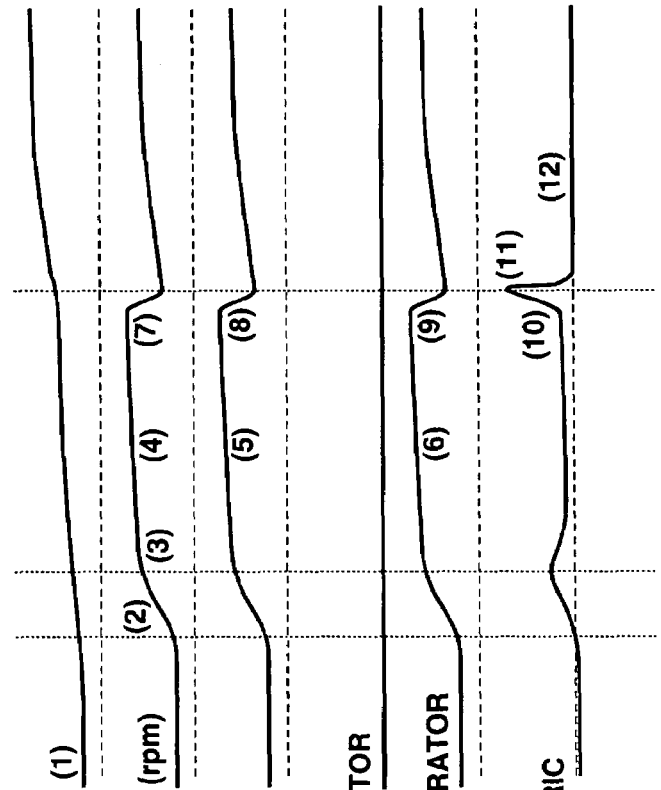

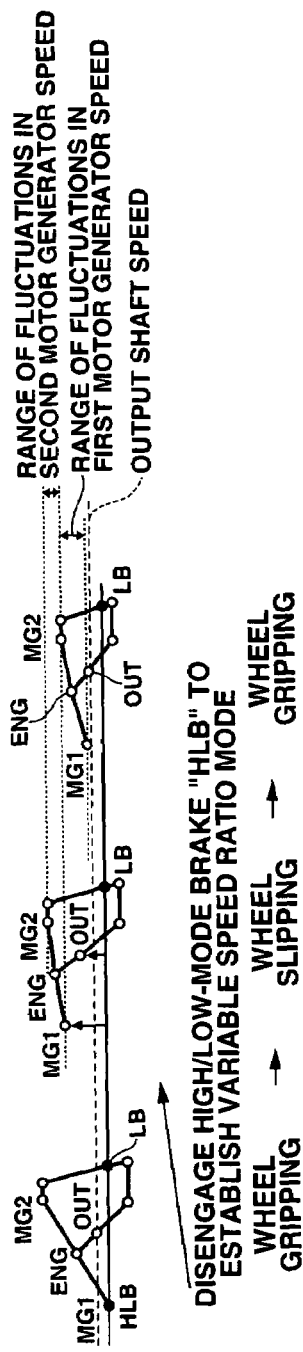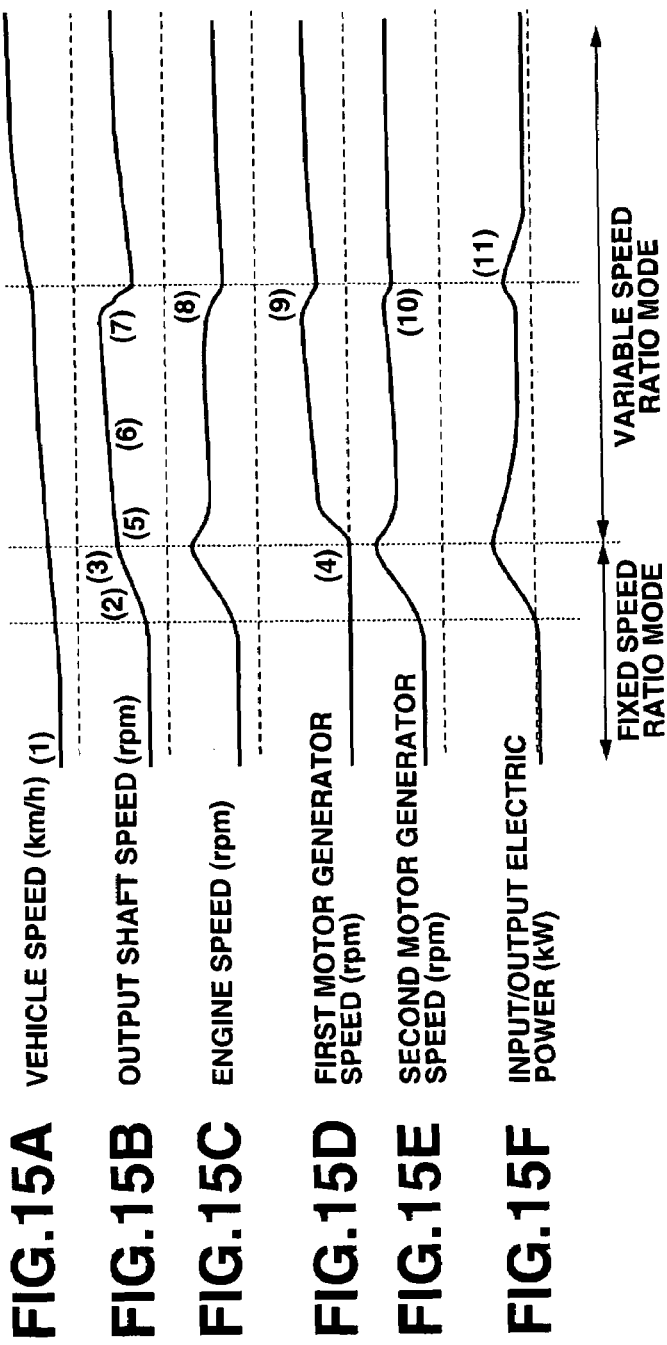

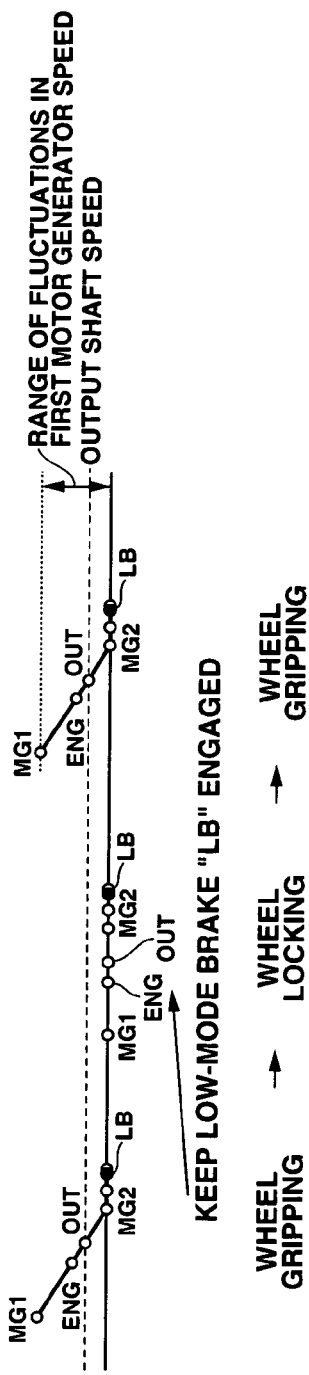
FIG.16A  FIG.16B  FIG.16C
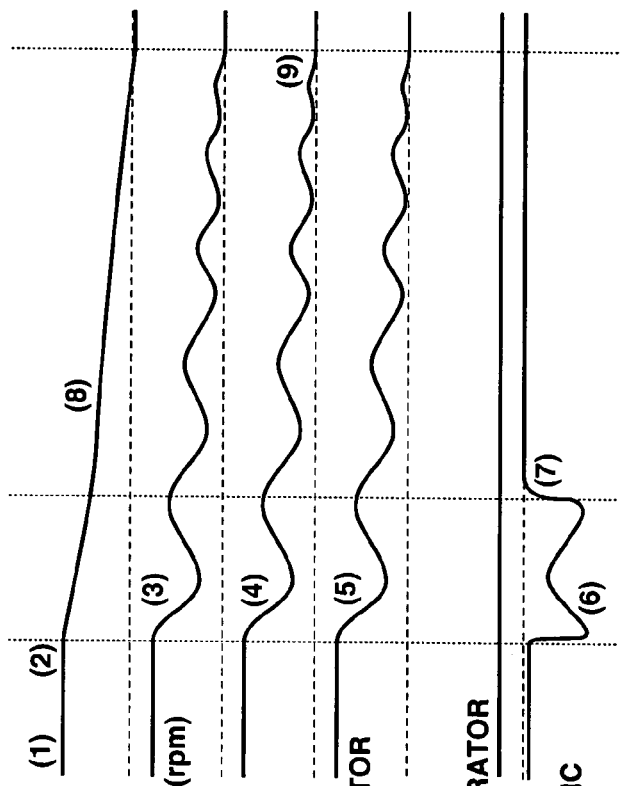
FIG.17A  VEHICLE SPEED (km/h)
FIG.17B  OUTPUT SHAFT SPEED (rpm)
FIG.17C  ENGINE SPEED (rpm)
FIG.17D  FIRST MOTOR GENERATOR SPEED (rpm)
FIG.17E  SECOND MOTOR GENERATOR SPEED (rpm)
FIG.17F  INPUT/OUTPUT ELECTRIC POWER (kW)

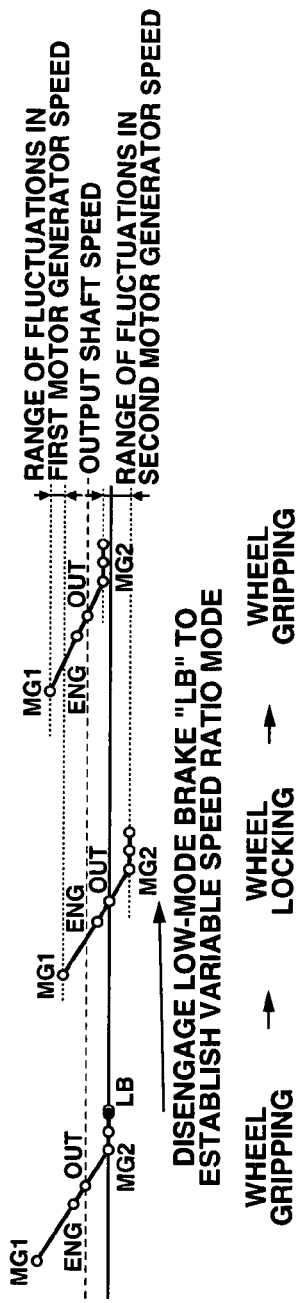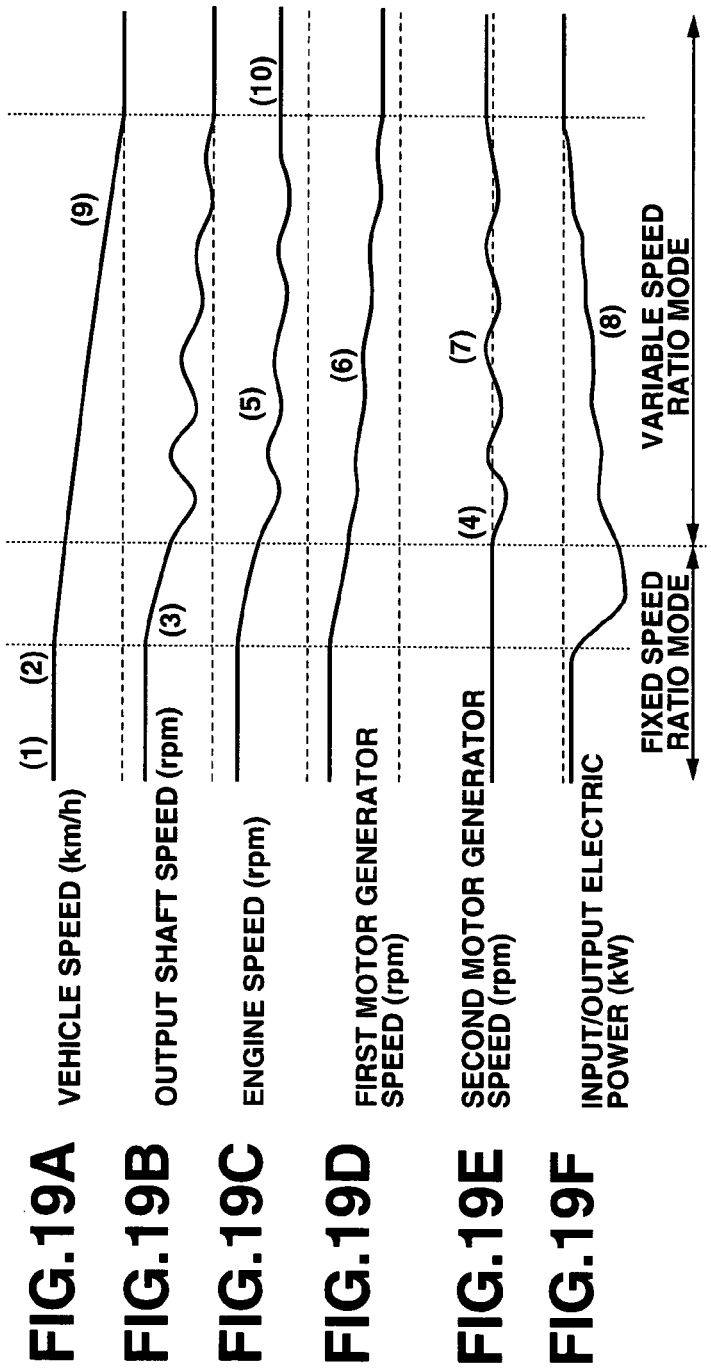

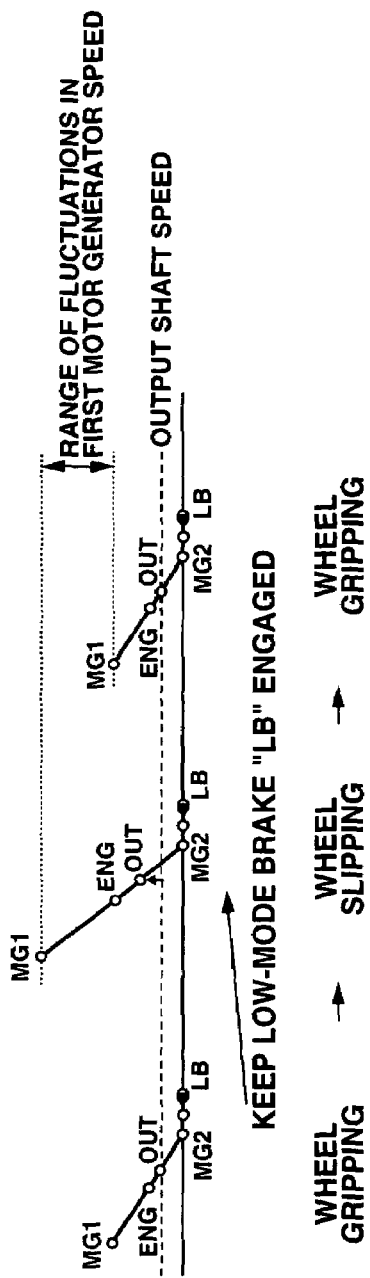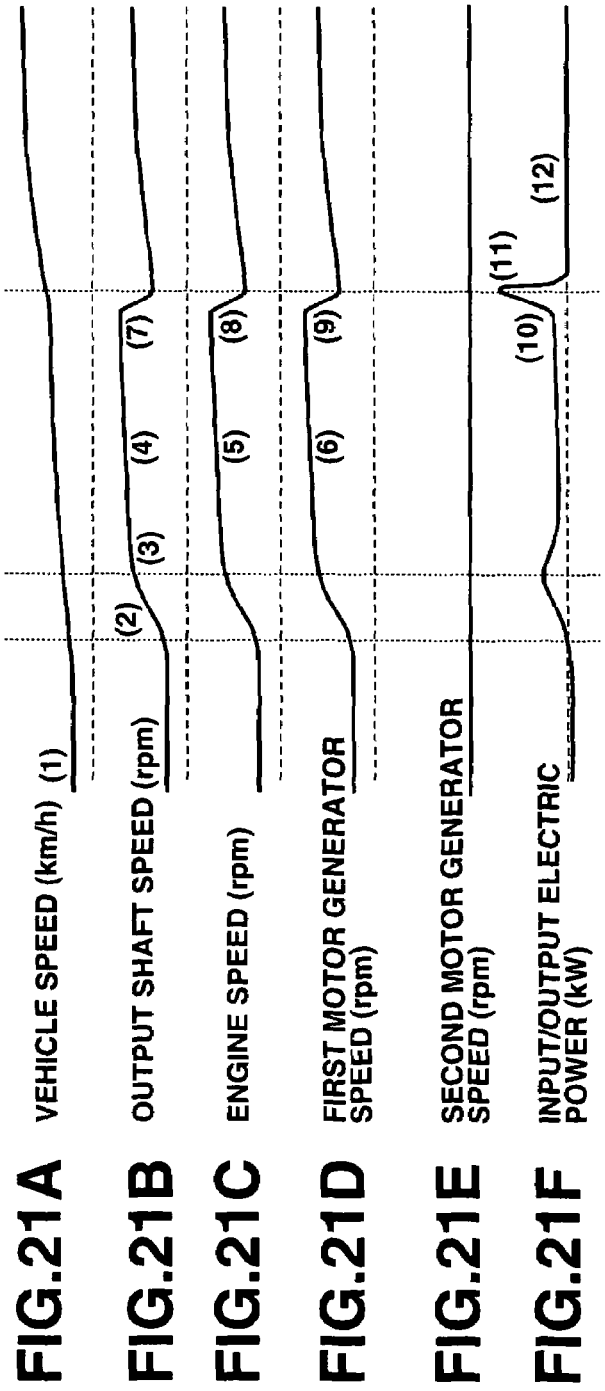

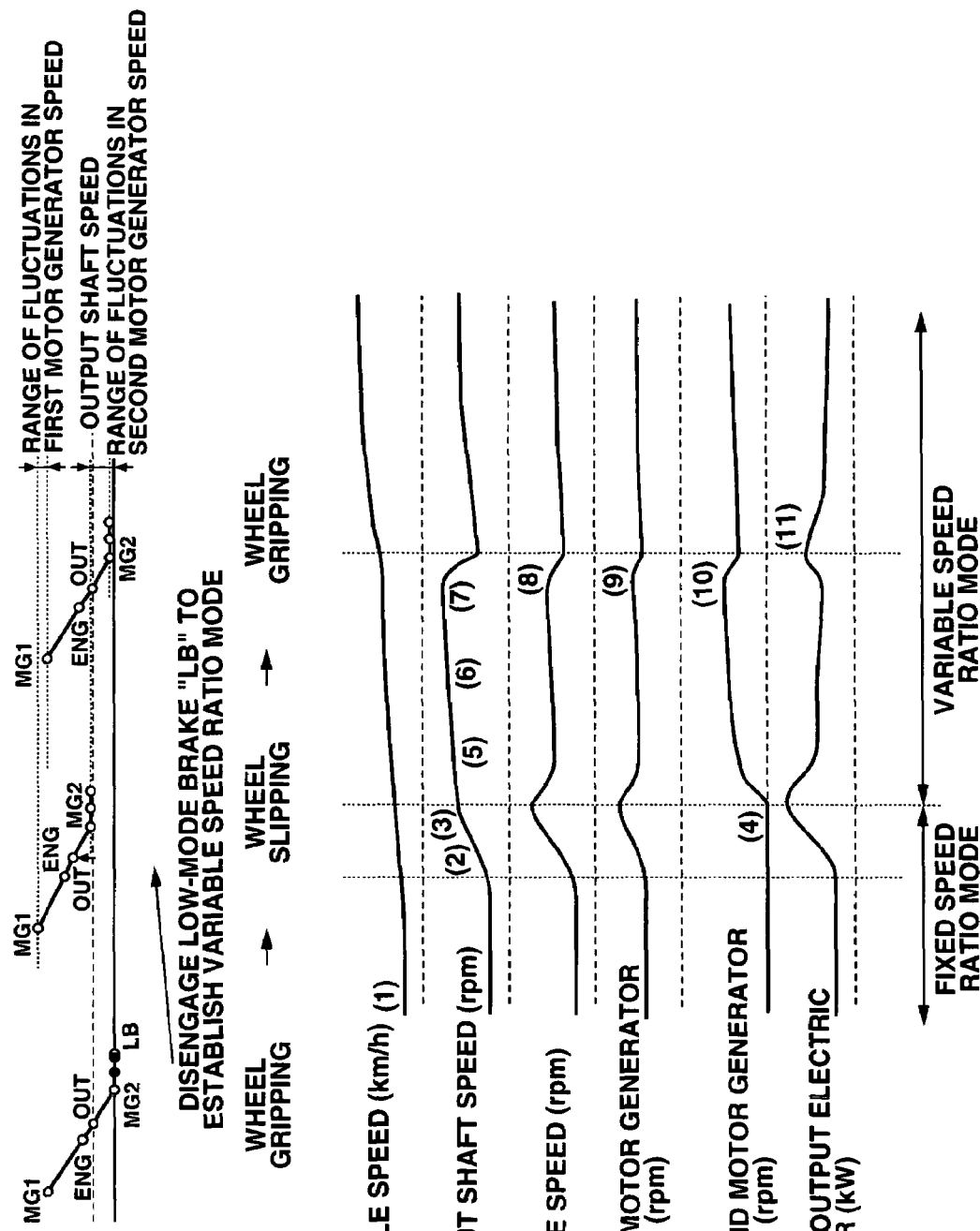

VEHICLE DRIVE CONTROL APPARATUS AND METHOD

BACKGROUND OF THE INVENTION

The present invention relates generally to a vehicle drive control apparatus and method, and more particularly to a vehicle drive control apparatus and method for speed shift control for an automotive vehicle operable in at least a fixed speed ratio mode in which a speed ratio of an output to an input is fixed and at least a variable speed ratio mode in which the speed ratio is allowed to vary.

Japanese Published Patent Application No. 2004-150627 (henceforth referred to as "JP2004-150627") shows a hybrid drive system for an automotive vehicle that has six rotating elements in a below-described speed relationship diagram and interconnects an input from an engine, an output to drive wheels, a first motor generator, and a second motor generator. This hybrid drive system is configured to establish a continuously variable speed ratio mode and a fixed speed ratio mode. In the continuously variable speed ratio mode, the speed ratio of an output to an input is controlled to vary continuously, while in the fixed speed ratio mode the speed ratio is controlled to be fixed by holding stationary one of the rotating elements by means of a brake. These modes are each selected in accordance with a running state of the vehicle.

SUMMARY OF THE INVENTION

In recent years, automotive vehicles are equipped with called an anti-lock brake system (henceforth referred to as "ABS") for avoiding wheel lock due to rapid braking when brake pedal operation of a driver induces a braking effort, or called a traction control system (henceforth referred to as "TCS") for avoiding wheel slip due to rapid acceleration when accelerator pedal operation of a driver induces a driving effort in vehicle start or acceleration. An ABS controls the slip ratio of associated wheels to be within a desired range by adjusting each wheel cylinder pressure with a pressure control valve carried in a brake control unit. A TCS controls the slip ratio of associated wheels to be within a desired range by adjusting the output torque of an associated engine.

While an ABS or TCS operates, a lock state or slip state and a grip state of associated wheels are repeatedly shifted to each other within a short period of time by the control of the slip ratio of the wheels, resulting in quick fluctuation in each wheel speed. When an automotive vehicle carrying such a hybrid drive system as disclosed in JP2004-150627, and an ABS or TCS is running in a fixed speed ratio mode, and the ABS or TCS is activated, the rotational speed of the motor generators fluctuates in accordance with the quick fluctuation in the each wheel speed. This may result in a fall in the durability of an associated electric circuit that controls the motor generators.

Accordingly, it is an object of the present invention to provide a vehicle drive control apparatus for controlling without a fall in durability speed shift and slip state of an automotive vehicle operable in at least a fixed speed ratio mode and at least a variable speed ratio mode.

In accordance with one aspect of the present invention, a vehicle drive control apparatus for a wheeled vehicle including a first motor generator, and a second motor generator, the vehicle drive control apparatus comprises: a planetary gear set including a first rotating element adapted to be drivingly connected to the first motor generator, a second rotating element adapted to be drivingly connected to the second motor generator, and a third rotating element adapted to be drivingly connected to a drive wheel of the vehicle; a rotation control mechanism adapted selectively to restrict rotation of one of the first and second rotating elements of the planetary gear set to establish a fixed speed ratio mode, and to release the one of the first and second rotating elements to establish a variable speed ratio mode; a wheel slip detector configured to detect a slip state of the drive wheel with respect to a road surface; and a control unit configured to control each operating state of the rotation control mechanism, the first motor generator, and the second motor generator, the control unit being configured to establish the variable speed ratio mode when the slip state of the drive wheel is detected in the fixed speed ratio mode.

In accordance with another aspect of the invention, a vehicle drive control apparatus for a wheeled vehicle including an engine, a first motor generator, and a second motor generator, the vehicle drive control apparatus comprises: a case; a first single-pinion planetary gear comprising a first sun gear, a first planet-pinion carrier, and a first ring gear; a second single-pinion planetary gear comprising a second sun gear, a second planet-pinion carrier, and a second ring gear; a third single-pinion planetary gear comprising a third sun gear, a third planet-pinion carrier, and a third ring gear, the third planet-pinion carrier being drivingly connected to a drive wheel of the vehicle; a first rotating member coupling the first sun gear and the second sun gear, the first rotating member being drivingly connected to the second motor generator; a second rotating member coupling the first ring gear and the third sun gear; a third rotating member coupling the second planet-pinion carrier and the third ring gear; a first clutch selectively and drivingly connecting and disconnecting the engine and the first motor generator; a second clutch selectively and drivingly connecting and disconnecting the second ring gear and the first motor generator; a third clutch selectively and drivingly connecting and disconnecting the first planet-pinion carrier and the second motor generator; a fourth clutch selectively and drivingly connecting and disconnecting the third rotating member and the engine; a first brake selectively and drivingly connecting and disconnecting the second ring gear and the case; a second brake selectively and drivingly connecting and disconnecting the first planet-pinion carrier and the case; a wheel slip detector configured to detect a slip state of the drive wheel with respect to a road surface; and a control unit configured to control each operating state of the first, second, third, and fourth clutches, the first and second brakes, and the first and second motor generators to establish at least a fixed speed ratio mode in which a speed ratio of the third planet-pinion carrier to the third rotating member is fixed and at least a variable speed ratio mode in which the speed ratio is allowed to vary, the control unit being configured to establish the at least a variable speed ratio mode when the slip state of the drive wheel is detected in the at least a fixed speed ratio mode.

In accordance with a further aspect of the invention, a vehicle drive control apparatus for a wheeled vehicle including a first motor generator, and a second motor generator, the vehicle drive control apparatus comprises: a planetary gear set including a first rotating element adapted to be drivingly connected to the first motor generator, a second rotating element adapted to be drivingly connected to the second motor generator, and a third rotating element adapted to be drivingly connected to a drive wheel of the vehicle; rotation control means for selectively restricting rotation of one of the first and second rotating elements of the planetary gear set to establish a fixed speed ratio mode, and releasing the one of the first and second rotating elements to establish a variable speed ratio mode; wheel slip detecting means for detecting a slip state of the drive wheel with respect to a road surface; and control means for controlling each operating state of the rotation control mechanism, the first motor generator, and the second motor generator, the control means being configured to establish the variable speed ratio mode when the slip state of the drive wheel is detected in the fixed speed ratio mode.

In accordance with a still further aspect of the invention, a vehicle drive control method for a wheeled vehicle including a first motor generator, a second motor generator, a planetary gear set including a first rotating element adapted to be drivingly connected to the first motor generator, a second rotating element adapted to be drivingly connected to the second motor generator, and a third rotating element adapted to be drivingly connected to a drive wheel of the vehicle, and a rotation control mechanism adapted selectively to restrict rotation of one of the first and second rotating elements of the planetary gear set to establish a fixed speed ratio mode, and to release the one of the first and second rotating elements to establish a variable speed ratio mode, comprises: controlling each operating state of the rotation control mechanism, the first motor generator, and the second motor generator; detecting a slip state of the drive wheel with respect to a road surface; and establishing the variable speed ratio mode when the slip state of the drive wheel is detected in the fixed speed ratio mode.

BRIEF DESCRIPTION OF THE DRAWINGS

FIGS. 8A to 8C are views showing a process of change of the speed relationship of the vehicle drive control apparatus of the first embodiment in case the ABS is operating in a LOW mode.

FIGS. 9A to 9F are graphs showing a process of change of the rotational speed of each rotating element of the vehicle drive control apparatus of the first embodiment in case the ABS is operating in the LOW mode.

FIGS. 10A to 10C are views showing a process of change of the speed relationship of the vehicle drive control apparatus of the first embodiment in case the ABS starts to operate after shift from the LOW mode to a LOW-iVT mode.

FIGS. 11A to 11F are graphs showing a process of change of the rotational speed of each rotating element of the vehicle drive control apparatus of the first embodiment in case the ABS starts to operate after shift from the LOW mode to the LOW-iVT mode.

FIGS. 12A to 12C are views showing a process of change of the speed relationship of the vehicle drive control apparatus of the first embodiment in case the TCS is operating in the LOW mode.

FIGS. 13A to 13F are graphs showing a process of change of the rotational speed of each rotating element of the vehicle drive control apparatus of the first embodiment in case the TCS is operating in the LOW mode.

FIGS. 14A to 14C are views showing a process of change of the speed relationship of the vehicle drive control apparatus of the first embodiment in case the TCS starts to operate after shift from the LOW mode to the LOW-iVT mode.

FIGS. 15A to 15F are graphs showing a process of change of the rotational speed of each rotating element of the vehicle drive control apparatus of the first embodiment in case the TCS starts to operate after shift from the LOW mode to the LOW-iVT mode.

FIGS. 16A to 16C are views showing a process of change of the speed relationship of the vehicle drive control apparatus of the first embodiment in case the ABS is operating in a 2ND mode.

FIGS. 17A to 17F are graphs showing a process of change of the rotational speed of each rotating element of the vehicle drive control apparatus of the first embodiment in case the ABS is operating in the 2ND mode.

FIGS. 18A to 18C are views showing a process of change of the speed relationship of the vehicle drive control apparatus of the first embodiment in case the ABS starts to operate after shift from the 2ND mode to a HIGH-iVT mode.

FIGS. 19A to 19F are graphs showing a process of change of the rotational speed of each rotating element of the vehicle drive control apparatus of the first embodiment in case the ABS starts to operate after shift from the 2ND mode to the HIGH-iVT mode.

FIGS. 20A to 20C are views showing a process of change of the speed relationship of the vehicle drive control apparatus of the first embodiment in case the TCS is operating in the 2ND mode.

FIGS. 21A to 21F are graphs showing a process of change of the rotational speed of each rotating element of the vehicle drive control apparatus of the first embodiment in case the TCS is operating in the 2ND mode.

FIGS. 22A to 22C are views showing a process of change of the speed relationship of the vehicle drive control apparatus of the first embodiment in case the TCS starts to operate after shift from the 2ND mode to the HIGH-iVT mode.

FIGS. 23A to 23F are graphs showing a process of change of the rotational speed of each rotating element of the vehicle drive control apparatus of the first embodiment in case the TCS starts to operate after shift from the 2ND mode to the HIGH-iVT mode.

DETAILED DESCRIPTION OF THE INVENTION

FIGS. 1 to 23F show a vehicle drive control apparatus in accordance with a first embodiment of the present invention. First, the following describes a drive system of a hybrid electric vehicle in which the vehicle drive control apparatus of the first embodiment is exemplified.

Figure 1:
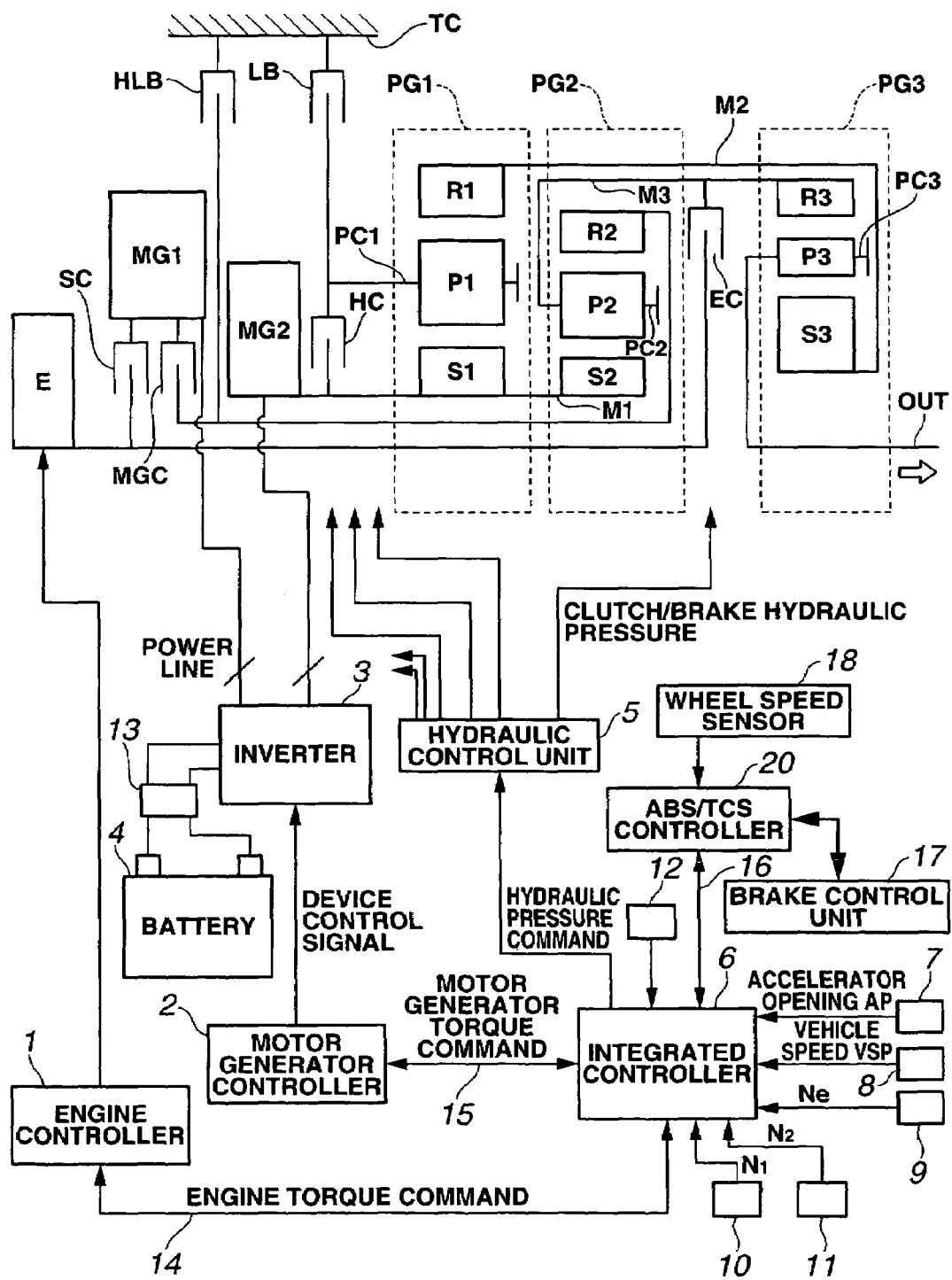
FIG. 1 is a schematic diagram showing a hybrid electric vehicle including a vehicle drive control apparatus in accordance with a first embodiment of the present invention.

FIG. 1 is a schematic diagram showing a hybrid electric vehicle including a vehicle drive control apparatus in accordance with a first embodiment of the present invention. As shown in FIG. 1, the drive system of the hybrid electric vehicle comprises an engine E; a first motor generator (generator) MG1; a second motor generator (motor generator) MG2; an output shaft (output member) OUT; a differential gear unit or planetary gear set (a first planetary gear PG1, a second planetary gear PG2, and a third planetary gear PG3) for interconnecting the input/output elements E, MG1, MG2, and OUT; frictional engaging elements (rotation control mechanisms), i.e. a LOW-mode brake (second brake) LB, a HIGH-mode clutch (third clutch) HC, and a HIGH/LOW-mode brake (first brake) HLB for connecting and disconnecting rotating members of the differential gear unit in response to hydraulic pressures controlled by a hydraulic control unit 5 in accordance with selected running modes; an engine clutch (fourth clutch) EC; a motor generator clutch (second clutch) MGC; and a series-mode clutch (first clutch) SC.

Engine E may be a gasoline engine or a diesel engine. The operating parameters of engine E such as the throttle opening and the fuel injection are controlled in accordance with a control command from an engine controller 1 as described below.

First motor generator MG1 and second motor generator MG2 are each formed as a synchronous motor generator that comprises a rotor embedded in with a permanent magnet, and a stator wound around with a stator coil. First motor generator MG1 and second motor generator MG2 are each controlled individually by applying a three phase alternating current produced by an inverter 3 in accordance with a control command from a motor generator controller 2 as described below. First motor generator MG1 and second motor generator MG2 are each configured to operate as an electric motor to rotate by electric power from a battery 4, and to operate as an electric generator to generate an electromotive force between the both ends of the stator coil to charge battery 4 with electric power while the rotor is rotating by external force.

As shown in FIG. 1, the differential gear unit comprises first planetary gear PG1, second planetary gear PG2, and third planetary gear PG3. Each of them is a simple planetary gear of a single-pinion type that has three rotating elements with two degrees of freedom. Specifically, first planetary gear PG1 comprises a first sun gear S1, a first ring gear R1, and a first planet-pinion carrier PC1 carrying first planet pinion set P1 meshed with first sun gear S1 and first ring gear R1. Similarly, second planetary gear PG2 comprises a second sun gear S2, a second ring gear R2, and a second planet-pinion carrier PC2 carrying second planet pinion set P2 meshed with second sun gear S2 and second ring gear R2. Further, third planetary gear PG3 comprises a third sun gear S3, a third ring gear R3, and a third planet-pinion carrier PC3 carrying third planet pinion set P3 meshed with third sun gear S3 and third ring gear R3.

As shown in FIG. 1, first sun gear S1 and second sun gear S2 are directly and rigidly connected by a first rotating member M1. Similarly, first ring gear R1 and third sun gear S3 are directly and rigidly connected by a second rotating member M2. Further, second planet-pinion carrier PC2 and the third ring gear R3 are directly and rigidly connected by a third rotating member M3. Accordingly, the differential gear unit includes six rotating elements with three degrees of freedom, and specifically includes first rotating member M1, second rotating member M2, third rotating member M3, first planet-pinion carrier PG1, second ring gear R2, and third planet-pinion carrier PC3.

The six rotating elements of the differential gear unit are drivingly connected to the power sources E, MG1, and MG2, and output shaft OUT, via the frictional engaging elements LB, HC, HLB, EC, SC, and MGC as follows. As shown in FIG. 1, first rotating member M1 (S1, S2) is drivingly connected to second motor generator MG2. Second rotating member M2 (R1, R3) is connected to none of the input/output elements. Third rotating member M3 (PC2, R3) is drivingly connected to engine E via an engine clutch EC. First planet-pinion carrier PC1 is selectively and drivingly connected to second motor generator MG2 via a HIGH-mode clutch HC, and also selectively and drivingly connected and held stationary via a LOW-mode brake LB to a transmission case TC. Second ring gear R2 is selectively and drivingly connected to first motor generator MG1 via a motor generator clutch MGC, and also selectively and selectively and drivingly connected and held stationary via a HIGH/LOW-mode brake HLB to transmission case TC. Third planet-pinion carrier PC3 is drivingly connected directly to output shaft OUT. Output shaft OUT is adapted to output a driving torque which is transmitted to left and right drive wheels not shown via a propeller shaft not shown, a differential not shown, and a drive shaft not shown. Engine E is selectively and drivingly connected to first motor generator MG1 via a series clutch SC.

Figure 2A:
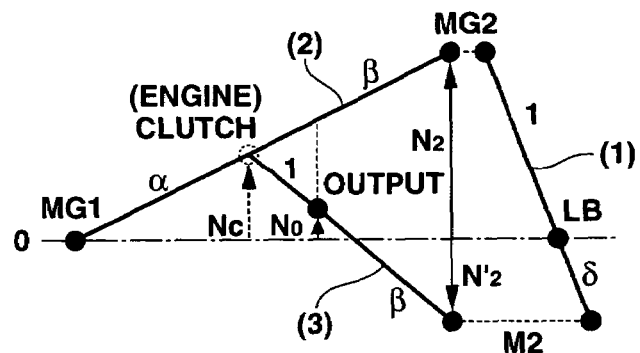
FIGS. 2A to 2E are speed relationship diagrams showing five running modes of an electric vehicle mode of the vehicle drive control apparatus of the first embodiment.

With the above-mentioned connections, the rotating elements of the differential gear unit are arranged in order of first motor generator MG1 (R2), engine E (PC2, R3), output shaft OUT (PC3), and second motor generator MG2 (S1, S2) in a speed relationship diagram or lever diagram as shown in FIG. 2A. A speed relationship diagram expresses a simple planetary gear as a straight line connecting three rotating elements, serving for simply expressing the dynamic operation of rotating elements of a differential gear unit, serving for finding the rotational speeds of the rotating elements by a geometrical method instead of an algebraic method, and serving for finding the speed ratio of a differential gear unit. In the speed relationship diagram of FIG. 2A, the rotating elements of the differential gear unit are expressed by three rigid levers (1) to (3), which indicate first planetary gear PG1, second planetary gear PG2, and third planetary gear PG3, respectively. In a speed relationship diagram, the rotational speed of each rotating element is taken along a vertical axis, while the rotating elements are arranged along a horizontal axis. In each simple planetary gear, the distances from the point indicative of a planet-pinion to the points indicative of a ring gear and a sun gear are set in accordance with a lever ratio ($\alpha$, $\beta$, $\gamma$) defined as the ratio between the number of teeth of the ring gear and the number of teeth of the sun gear.

LOW-mode brake LB is a multi-plate friction brake, and is operated to be selectively in an engaged state and in a disengaged state by means of a hydraulic pressure to selectively connect and disconnect first planet-pinion carrier PC1 to transmission case TC. In the speed relationship diagram of FIG. 4, LOW-mode brake LB is located on the right side of the vertical line indicative of second motor generator MG2. As shown in FIGS. 2A to 2C, and 3A to 3C, LOW-mode brake LB is engaged to establish modes for lower speed gears, namely, a fixed low gear mode, a fixed second gear mode, and an infinitely variable low gear mode.

HIGH-mode clutch HC is a multi-plate friction clutch, and is operated to be selectively in an engaged state and in a disengaged state by means of a hydraulic pressure to selectively connect and disconnect first planet-pinion carrier PC1 to second motor generator MG2. In the speed relationship diagram of FIG. 4, HIGH-mode clutch HC is located on the vertical line indicative of second motor generator MG2. As shown in FIGS. 2C to 2E, and 3C to 3E, HIGH-mode clutch HC is engaged to establish modes for higher speed gears, namely, the fixed second gear mode, an infinitely variable high gear mode, and a fixed high gear mode.

HIGH/LOW-mode brake HLB is a multi-plate friction brake, and is operated to be selectively in an engaged state and in a disengaged state by means of a hydraulic pressure to selectively connect and disconnect second ring gear R2 to transmission case TC. In the speed relationship diagram of FIG. 4, HIGH/LOW-mode brake HLB is located on the vertical line indicative of first motor generator MG1. As shown in FIGS. 2A, 2E, 3A, and 3E, HIGH/LOW-mode brake HLB is engaged to establish the fixed low gear mode with engaging LOW-mode brake LB, and to establish the fixed high gear mode with engaging HIGH-mode clutch HC.

Engine clutch EC is a multi-plate friction clutch, and is operated to be selectively in an engaged state and in a disengaged state by means of a hydraulic pressure to selectively connect and disconnect third rotating member M3 to engine E. In the speed relationship diagram of FIG. 4, engine clutch EC is located on the vertical line indicative of engine E. While in the engaged state, engine clutch EC transmits the rotation and output torque of engine E to third rotating member M3 (PC2, R3) as an engine input rotating element.

Series-mode clutch SC is a multi-plate friction clutch, and is operated to be selectively in an engaged state and in a disengaged state by means of a hydraulic pressure to selectively connect and disconnect engine E to first motor generator MG1. In the speed relationship diagram of FIG. 4, engine clutch EC is located between the vertical lines indicative of engine E and first motor generator MG1. While in the engaged state, series-mode clutch SC rigidly couples engine E and first motor generator MG1.

Motor generator clutch MGC is a multi-plate friction clutch, and is operated to be selectively in an engaged state and in a disengaged state by means of a hydraulic pressure to selectively connect and disconnect second ring gear R2 to first motor generator MG1. In the speed relationship diagram of FIG. 4, motor generator clutch MGC is located between first motor generator MG1 and second ring gear R2. While in the engaged state, series-mode clutch SC rigidly couples first motor generator MG1 and second ring gear R2.

The following describes a control system of the hybrid electric vehicle. As shown in FIG. 1, the control system of the hybrid electric vehicle comprises an engine controller 1, a motor generator controller 2, an inverter 3, a rechargeable high-voltage battery 4, a hydraulic control unit 5, an integrated controller (control unit) 6, an accelerator opening sensor 7, a vehicle speed sensor 8, an engine speed sensor 9, a first motor generator speed sensor 10, a second motor generator speed sensor 11, a third ring gear speed sensor 12, and a DC/DC booster converter 13.

Engine controller 1 is configured to receive a control signal indicative of a desired engine torque Te from integrated controller 6, and to output a command to a throttle valve actuator not shown to control an engine operating point (Ne, Te) of engine E, where Ne represents engine speed. Desired engine torque Te is determined by integrated controller 6 in accordance with an accelerator opening AP from accelerator opening sensor 7 and an engine speed Ne from engine speed sensor 9.

Motor generator controller 2 is configured to receive a control signal indicative of desired motor generator torques T1, T2 from integrated controller 6, and to output a command to inverter 3 for controlling an operating point (N1, T1) of first motor generator MG1, and a command to inverter 3 for controlling an operating point (N2, T2) of second motor generator MG2, where N1 and N2 represent the rotational speeds of first motor generator MG1 and second motor generator MG2, respectively. The operating points of first motor generator MG1 and second motor generator MG2 are each independently controlled. Rotational speeds N1 and N2 are input to integrated controller 6 from first motor generator speed sensor 10 and second motor generator speed sensor 11 each including a resolver. Motor generator controller 2 is configured to receive a data signal indicative of the state-of-charge (SOC) of battery 4, and to output it to integrated controller 6.

Inverter 3 is connected to each stator coil of first motor generator MG1 and second motor generator MG2, and supplies individual three-phase currents in accordance with a control signal from integrated controller 6. Inverter 3 is connected via DC/DC booster converter 13 to battery 4 where electric energy is discharged at acceleration and is charged at regeneration. With DC/DC booster converter 13, electric power is supplied with high voltage and low current to first motor generator MG1 and second motor generator MG2, minimizing the power loss.

Hydraulic control unit 5 is configured to receive a hydraulic pressure command from integrated controller 6, and configured to control the operating state of LOW-mode brake LB, HIGH-mode clutch HC, HIGH/LOW-mode brake HLB, engine clutch EC, series-mode clutch SC, and motor generator clutch MGC, by means of a hydraulic pressure supplied by an oil pump. The operating state of each frictional engaging element includes the engaged state, the disengaged state, and a half-engaged state. Thus, hydraulic control unit 5 controls hydraulic pressure for full engagement, full disengagement, shift from full engagement to half engagement, and shift from full disengagement to half engagement, of each frictional engaging element.

An ABS/TCS controller 20 is configured to receive a data signal indicative of four wheel speeds from a wheel speed sensor 18, and configured to output a control signal to brake control unit 17 and integrated controller 6. ABS/TCS controller 20 comprises an artificial vehicle speed computing section for computing an artificial or estimated vehicle speed of the hybrid electric vehicle, a slip state detecting section (wheel slip detector) for detecting a slip state of each wheel of the hybrid electric vehicle by comparing the artificial vehicle speed and each wheel speed, an ABS controlling section (first wheel slip controller), and a TCS controlling section (second wheel slip controller). When a longitudinal slip velocity defined as the difference between the spin velocity of a driven or braked tire and the spin velocity of a straight free-rolling tire or a longitudinal slip defined as the ratio of the longitudinal slip velocity to the spin velocity of the straight free-rolling tire is beyond a predetermined threshold, the slip state detecting section determines that a slip state of each wheel is present.

When brake pedal operation of a driver induces a slip state (braking slip state) between a wheel and a road surface and the slip state is detected, the ABS controlling section of ABS/TCS controller 20 controls the brake fluid pressure of each wheel cylinder by adjusting the operating state (open/closed) of each control valve of brake control unit 17, to establish a desired slip state. Although in the first embodiment the hydraulic brake system is used to obtain a braking effort by the hydraulic pressure of brake fluid, the braking effort may be produced by an electric brake system where an electric motor controls the position of a brake pad.

On the other hand, when accelerator pedal operation of a driver induces a slip state (driving slip state) between a wheel and a road surface and the slip state is detected, the TCS controlling section of ABS/TCS controller 20 controls the output torque of engine E through integrated controller 6 and engine controller 1, to establish a desired slip state. Although the TCS controlling section controls the output torque of engine E in the first embodiment, the TCS controlling section may control the engaging force of engine clutch EC to limit the driving torque, or may produce a braking effort by means of each brake caliper of the road wheels of the vehicle in order to establish the desired slip state.

Integrated controller 6 is configured to receive data signals from the sensors, and specifically configured to receive signals indicative of accelerator opening AP from accelerator opening sensor 7, vehicle speed VSP from vehicle speed sensor 8, engine speed Ne from engine speed sensor 9, first motor generator speed N1 from first motor generator speed sensor 10, second motor generator speed N2 from second motor generator speed sensor 11, engine input speed ω in from third ring gear speed sensor 12, and data on the ABS control and TCS control from ABS/TCS controller 20. Integrated controller 6 is configured to perform a predetermined process of computing based on the above input data to determine a control command, and configured to output the control command to engine controller 1, motor generator controller 2, and hydraulic control unit 5. Integrated controller 6 serves for managing the whole consumption energy of the hybrid electric vehicle, and basically driving the vehicle with optimum efficiency. Integrated controller 6 is connected for data exchange to engine controller 1, motor generator controller 2, and ABS/TCS controller 20, via bidirectional communication lines 14, 15, and 16, respectively.

The following describes running modes of the vehicle drive control apparatus of the first embodiment. The vehicle drive control apparatus of the first embodiment is configured to operate the hybrid electric vehicle in five running modes, i.e. a fixed low gear mode (henceforth referred to as "LOW mode"), a low-side infinitely variable gear mode (henceforth referred to as "LOW-iVT mode"), a fixed second gear mode (henceforth referred to as "2ND mode"), a high-side infinitely variable gear mode (henceforth referred to as "HIGH-iVT mode"), and a fixed high gear mode (henceforth referred to as "HIGH mode").

On the other hand, from the viewpoint of which driving source is used, the vehicle drive control apparatus of the first embodiment has two modes of employing the driving sources, i.e. an electric vehicle mode (henceforth referred to as "EV mode") in which the vehicle runs with first and second motor generators MG1 and MG2 without using engine E, and a hybrid electric vehicle mode (henceforth referred to as "HEV mode") in which the vehicle runs with engine E, and first and second motor generators MG1 and MG2.

Combining the foregoing two categories of running mode, the vehicle drive control apparatus establishes ten running modes, i.e. the five running modes of the EV mode as shown in FIGS. 2A to 2E, and the five running modes of the HEV mode as shown in FIGS. 3A to 3E.

Further, from another viewpoint, the running modes are divided into two groups, i.e. a group of variable speed ratio modes including the LOW-iVT mode and the HIGH-iVT mode, and a group of fixed speed ratio modes including the LOW mode, 2ND mode, and HIGH mode. In each fixed speed ratio mode, the speed ratio of third planet-pinion carrier PC3 to third rotating member M3 is fixed, while in each variable speed ratio mode, the speed ratio is allowed to vary. Similarly, in each fixed speed ratio mode, the speed ratio of the rotating element connected to freely-rotating motor generator to third rotating member M3 is fixed.

FIGS. 2A to 2E show the speed relationship diagrams of "EV-LOW mode", "EV-LOW-iVT mode", "EV-HIGH-iVT mode", "EV-2ND mode", and "EV-HIGH mode", respectively. FIGS. 3A to 3E show the speed relationship diagrams of "HEV-LOW mode", "HEV-LOW-iVT mode", "HEV-HIGH-iVT mode", "HEV-2ND mode", and "HEV-HIGH mode", respectively.

Figure 3A:
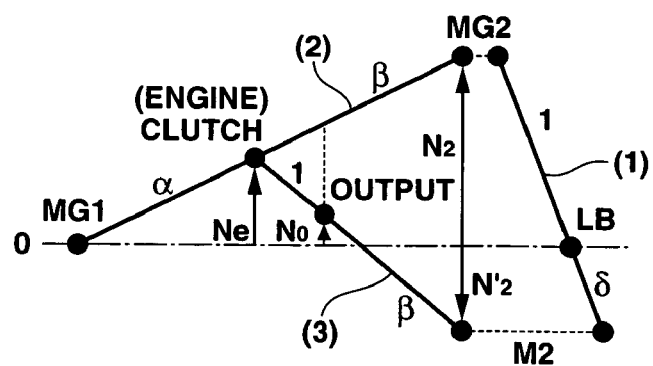
FIGS. 3A to 3E are speed relationship diagrams showing five running modes of a hybrid electric vehicle mode of the vehicle drive control apparatus of the first embodiment.

As shown in the speed relationship diagrams of FIGS. 2A and 3A, the LOW mode is a fixed low gear mode that is established by engaging LOW-mode brake LB, disengaging HIGH-mode clutch HC, engaging HIGH/LOW-mode brake HLB, disengaging series-mode clutch SC, and engaging motor generator clutch MGC.

Figure 2B:
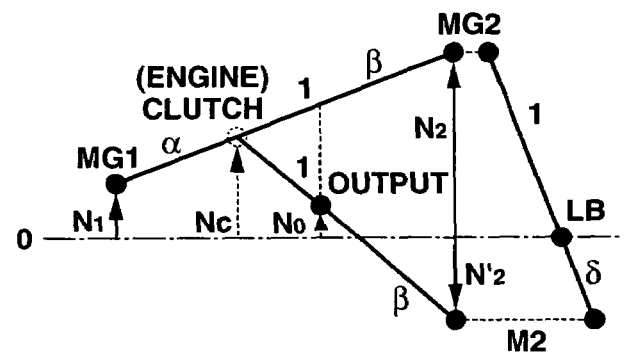
Figure 3B:
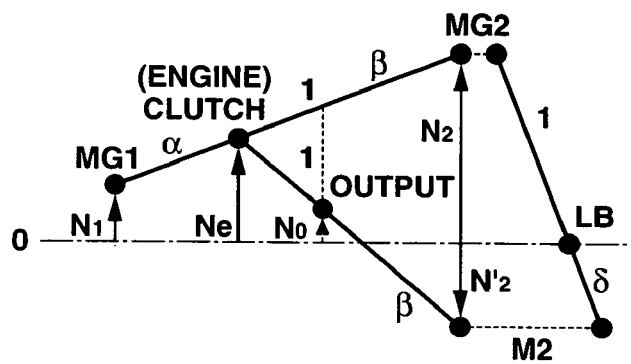

As shown in the speed relationship diagrams of FIGS. 2B and 3B, the LOW-iVT mode is a low-side infinitely variable gear mode that is established by engaging LOW-mode brake LB, disengaging HIGH-mode clutch HC, disengaging HIGH/LOW-mode brake HLB, disengaging series-mode clutch SC, and engaging motor generator clutch MGC.

Figure 2C:
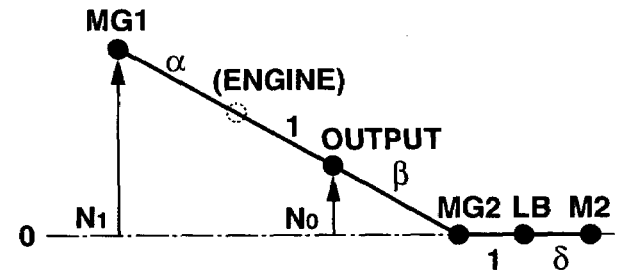
Figure 3C:
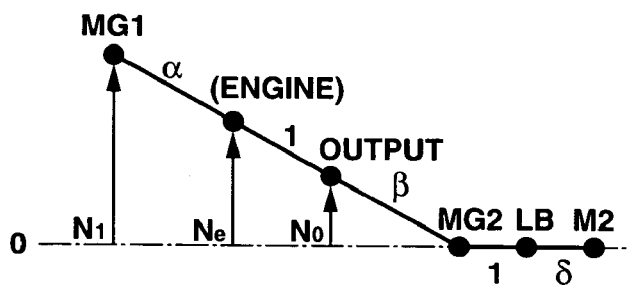

As shown in the speed relationship diagrams of FIGS. 2C and 3C, the 2ND mode is a fixed second gear mode that is established by engaging LOW-mode brake LB, engaging HIGH-mode clutch HC, disengaging HIGH/LOW-mode brake HLB, disengaging series-mode clutch SC, and engaging motor generator clutch MGC.

Figure 2D:
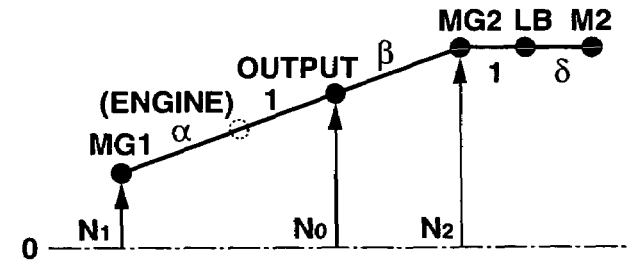
Figure 3D:
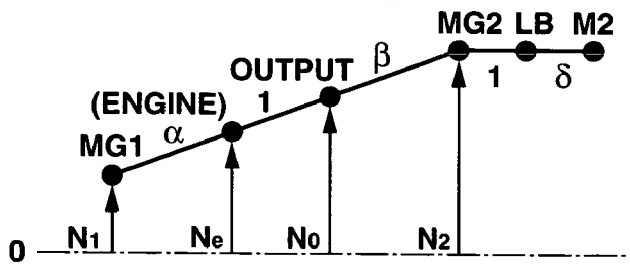

As shown in the speed relationship diagrams of FIGS. 2D and 3D, the HIGH-iVT mode is a high-side infinitely variable gear mode that is established by disengaging LOW-mode brake LB, engaging HIGH-mode clutch HC, disengaging HIGH/LOW-mode brake HLB, disengaging series-mode clutch SC, and engaging motor generator clutch MGC.

Figure 2E:
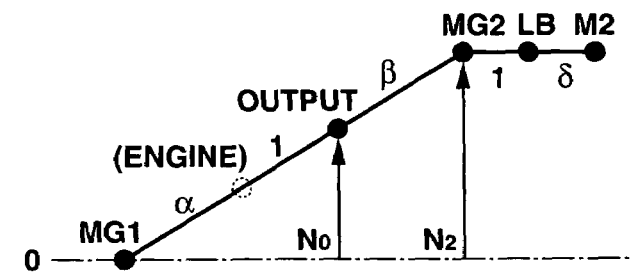
Figure 3E:
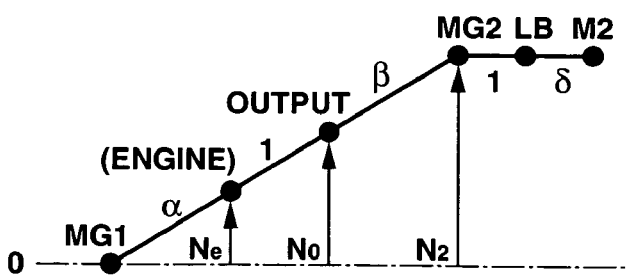
Figure 4:
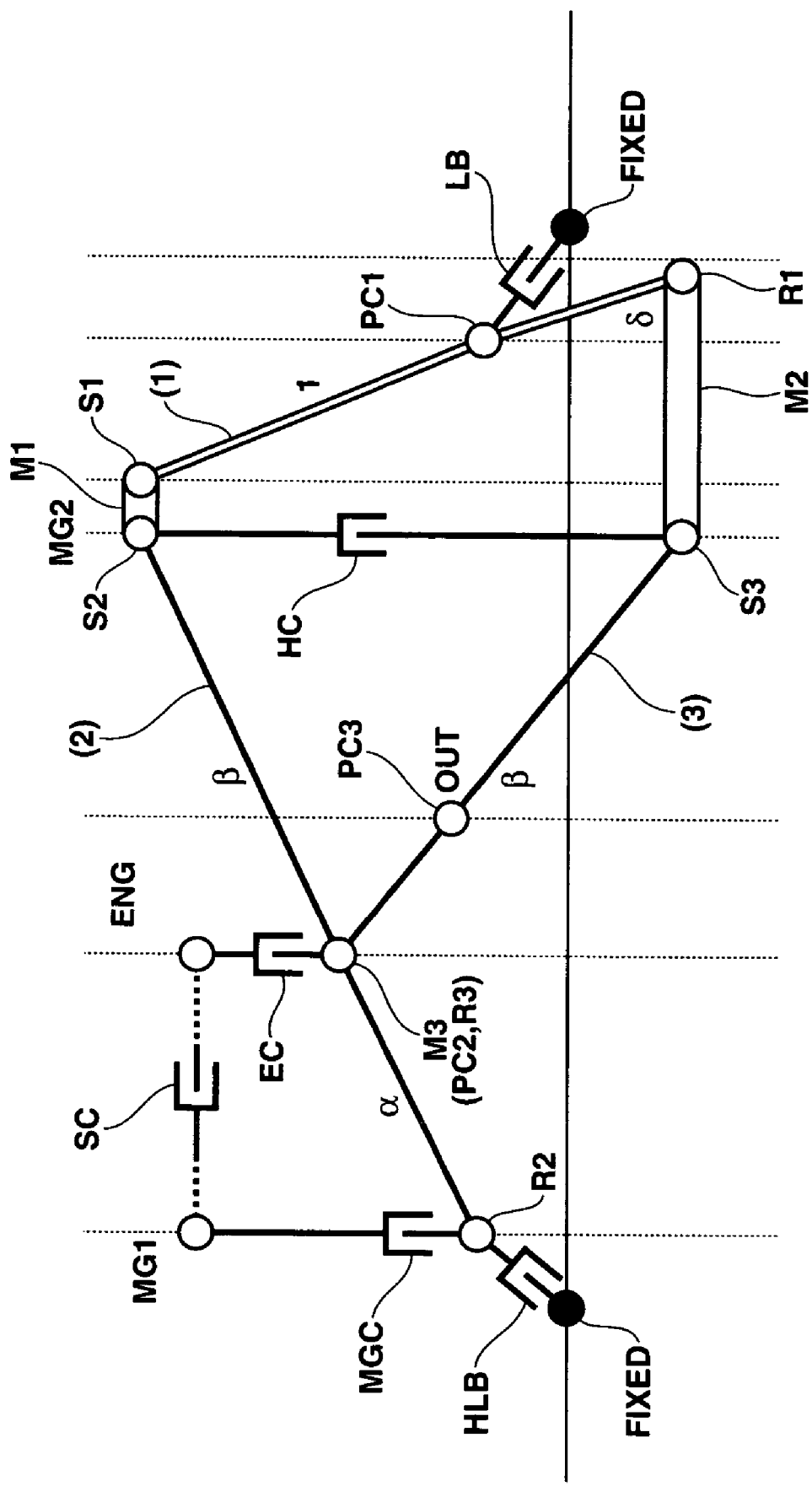
FIG. 4 is a speed relationship diagram showing arrangement of components of the vehicle drive control apparatus of the first embodiment.

As shown in the speed relationship diagrams of FIGS. 2E and 3E, the HIGH mode is a fixed high gear mode that is established by disengaging LOW-mode brake LB, engaging HIGH-mode clutch HC, engaging HIGH/LOW-mode brake HLB, disengaging series-mode clutch SC, and engaging motor generator clutch MGC.

Figures 5, 6:
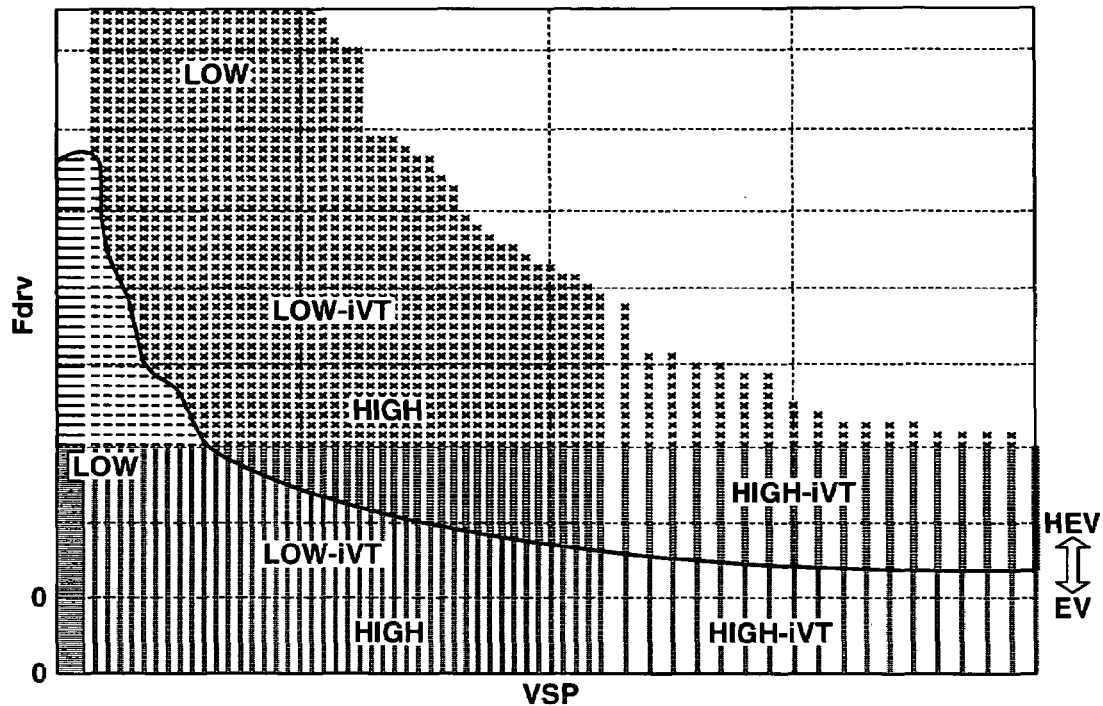
FIG. 5 is a graph showing an example of a running mode map used for selection of running mode in the vehicle drive control apparatus of the first embodiment.
FIG. 6 is an operation table showing operating states of clutches and brakes of the vehicle drive control apparatus of the first embodiment with which each running mode is established.

Integrated controller 6 is configured to control mode shift among the ten running modes. Specifically, integrated controller 6 has a predetermined running mode map as shown in FIG. 5 in which the ten running modes are allocated in a three dimensional space having axes of a requested driving force Fdrv, vehicle speed VSP, and the S.O.C. of battery 4. While the hybrid electric vehicle is operating, the running mode map is searched in accordance with each measured value of requested driving force Fdrv, vehicle speed VSP, and the S.O.C. of battery 4, to select an optimal running mode that is suitable for the vehicle operating point determined in accordance with requested driving force Fdrv and vehicle speed VSP and suitable for the S.O.C. of battery 4. FIG. 5 shows an example of the running mode map which is expressed with the two dimensions of requested driving force Fdrv and vehicle speed VSP by taking from the three-dimensional running mode map where the S.O.C of battery 4 is a certain value within a region in which the S.O.C of battery 4 is sufficient for use.

As shown in FIG. 6, with series-mode clutch SC and motor generator clutch MGC, the vehicle drive control apparatus establishes an additional running mode called series fixed low gear mode (henceforth referred to as "S-LOW mode") that is selected when the vehicle starts to run. The S-LOW mode is established by engaging LOW-mode brake LB, engaging HIGH/LOW-mode brake HLB, disengaging engine clutch EC disengaging HIGH-mode clutch HC, disengaging motor generator clutch MGC, and engaging series-mode clutch SC. That is, the ten running modes serve for driving a parallel type hybrid electric vehicle, while the S-LOW mode serves as a series fixed low gear mode of a series type hybrid electric vehicle in which engine E and first motor generator MG1 are separated from the speed relationship diagram, engine E drives first motor generator MG1 as a generator to generate electric power, battery 4 stores the generated electric power, and second motor generator MG2 is driven with the electric power stored in battery 4. Thus, in the first embodiment, the hybrid electric vehicle is constructed combining a series type and parallel type hybrid electric vehicle.

For example, when a mode shift between the EV mode and the HEV mode is performed in response to mode selection using the running mode map, integrated controller 6 controls start/stop of engine E, and engagement/disengagement of engine clutch EC as shown in FIG. 6. Similarly, when performing the mode shifts among the five modes of the EV mode, and the mode shifts among the five modes of the HEV mode, integrated controller 6 controls the operating state of each frictional engaging element in accordance with the ON/OFF operation table as shown in FIG. 6.

When a mode shift includes both start/stop of engine E and engagement/disengagement of a clutch or brake in parallel or when a mode shift includes engagement/disengagement of a plurality of clutches and brakes or when the rotational speeds of the motor generators are to be performed before start/stop of engine E and/or engagement/disengagement of a clutch or brake, integrated controller 6 performs a sequence control in accordance with a predetermined procedure.

Figure 7:
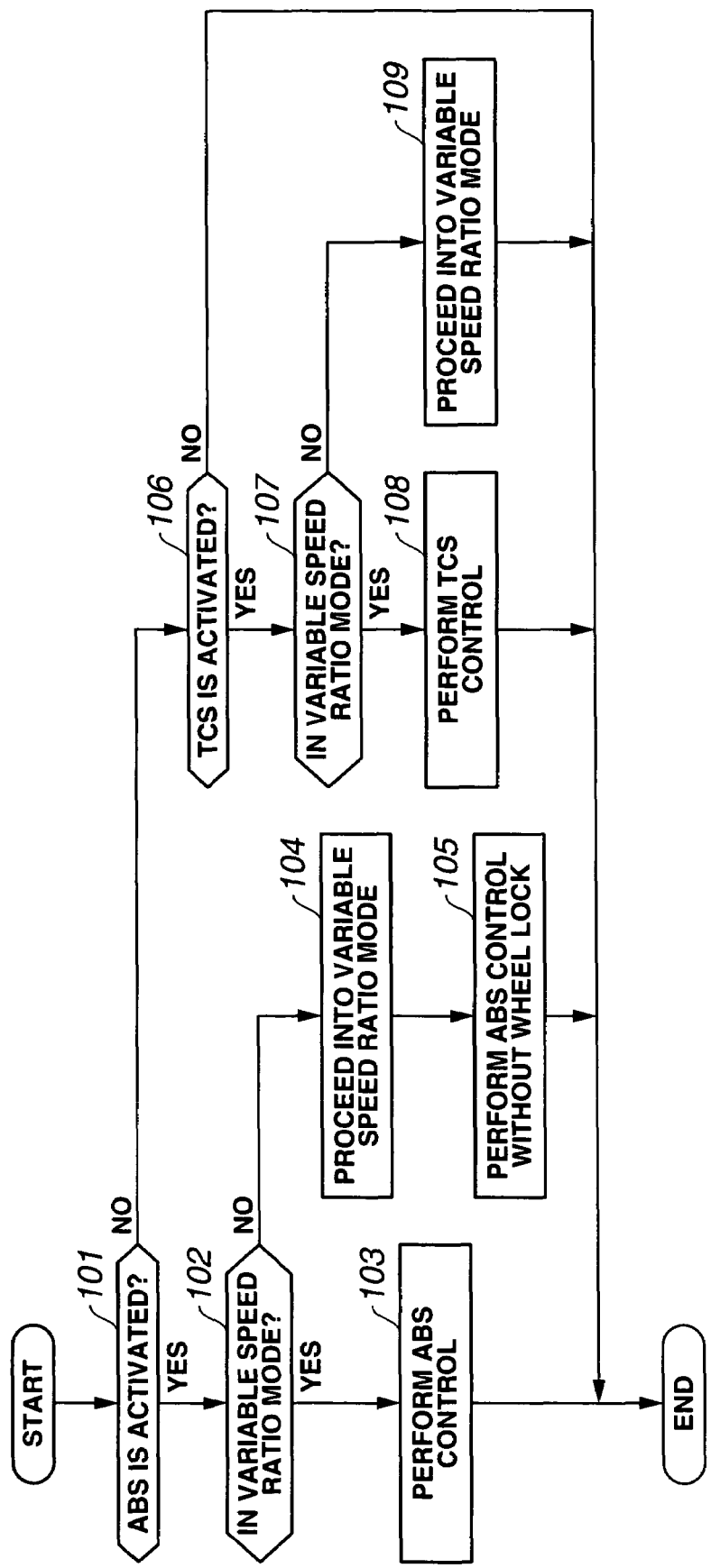
FIG. 7 is a flow chart showing a process of mode shift control of the vehicle drive control apparatus of the first embodiment under influence of operation of an ABS or TCS.

The following describes a process of mode shift from a fixed speed ratio mode to a variable speed ratio mode when a slip state of the drive wheels is detected in the fixed speed ratio mode, with reference to the flow chart of FIG. 7. First, at step 101, integrated controller 6 judges whether or not the ABS control is activated to be under operation, based on the data from ABS/TCS controller 20. When the ABS control is activated, the routine proceeds to step 102. On the other hand, when the answer to step 101 is negative, the routine proceeds to step 106. At step 102, integrated controller 6 judges whether or not the hybrid electric vehicle is operating in a variable speed ratio mode. When the hybrid electric vehicle is operating in a variable speed ratio mode, the routine proceeds to step 103. On the other hand, when the answer to step 102 is negative, the routine proceeds to step 104. At step 103, integrated controller 6 performs the ABS control (control of increase and decrease in the brake fluid pressure by means of brake control unit 17), applying a braking torque due to first motor generator MG1 and second motor generator MG2. At step 104, integrated controller 6 proceeds from the fixed speed ratio mode into a variable speed ratio mode. Subsequent to step 104, at step 105, integrated controller 6 performs the ABS control so as not to cause a wheel lock. At step 106, integrated controller 6 judges whether or not the TCS control is activated to be under operation, based on the data from ABS/TCS controller 20. When the TCS control is activated, the routine proceeds to step 107. On the other hand, when the answer to step 106 is negative, the routine returns. At step 107, integrated controller 6 judges whether or not the hybrid electric vehicle is operating in a variable speed ratio mode. When the hybrid electric vehicle is operating in a variable speed ratio mode, the routine proceeds to step 108. On the other hand, when the answer to step 107 is negative, the routine proceeds to step 109. At step 108, integrated controller 6 performs the TCS control (control of decrease in the engine torque), reducing the output torque of first motor generator MG1 and second motor generator MG2 to the drive wheels. At step 109, integrated controller 6 proceeds from the fixed speed ratio mode into a variable speed ratio mode.

The following describes operation of the above process in several cases, with reference to FIGS. 8A to 23F.

First, the following describes a case in which the ABS is operating in the LOW mode. FIGS. 8A to 8C are views showing a process of change of the speed relationship of the vehicle drive control apparatus. FIGS. 9A to 9F are graphs showing a process of change of the rotational speed of each rotating element of the vehicle drive control apparatus and the input/output electric power of the motor generators and battery 4. In the phase (1) as shown in FIGS. 9A to 9F, the hybrid electric vehicle is running at a certain speed in the LOW mode in accordance with the speed relationship of FIG. 8A. In the phase (2), brake pedal operation of a driver induces a tendency of lock of the drive wheels. In the phase (3), the wheel speed starts to rapidly decrease, i.e. the output shaft speed starts to rapidly decrease. In parallel, in the phases (4) and (5), the rotational speeds of engine E and second motor generator MG2 also rapidly decrease since engine E is rigidly coupled to second motor generator MG2. While the drive wheels are locking, the rotational speed of each rotating element decreases to zero as shown in FIG. 8B. When the hybrid electric vehicle stops in this state where the rotational speed of engine E is zero, engine E is stalled. When brake control unit 17 reduces the wheel cylinder pressure in order to release the wheel lock, the wheel is brought to be gripping, so that the rotational speed of second motor generator MG2 increases as shown in FIGS. 8B and 8C. In the phase (6), the rapid change in the rotational speed of second motor generator MG2 causes a rapid change in the input/output electric power of battery 4, resulting in an excessive load to DC/DC booster converter 13. Since the drive wheels repeatedly shift between lock and unlock due to the ABS control at intervals of tens of milliseconds, it is possible that the input/output electric power of battery 4 also repeatedly and rapidly fluctuates so that DC/DC booster converter 13 falls into failure in the phase (7). If DC/DC booster converter 13 falls into failure, it is impossible to use the braking effort of second motor generator MG2. As a result, the wheel speed decreases slowly to cause increase in the braking distance as shown in the phase (8).

The following describes a case in which the ABS starts to operate after shift from the LOW mode to the LOW-iVT mode. FIGS. 10A to 10C are views showing a process of change of the speed relationship of the vehicle drive control apparatus. FIGS. 11A to 11F are graphs showing a process of change of the rotational speed of each rotating element of the vehicle drive control apparatus and the input/output electric power of the motor generators and battery 4. In the phase (1) as shown in FIGS. 11A to 11F, the hybrid electric vehicle is running at a certain speed in the LOW mode in accordance with the speed relationship of FIG. 10A. In the phase (2), brake pedal operation of a driver induces a tendency of lock of the drive wheels. In the phase (3), the wheel speed starts to rapidly decrease, i.e. the output shaft speed starts to rapidly decrease. In the phase (4), integrated controller 6 disengages HIGH/LOW-mode brake HLB to proceed into the LOW-iVT mode. In this case, the rotational speed of first motor generator MG1 is allowed to decrease as shown in FIG. 10B. As a result, even when the rotational speed of output shaft OUT decreases, the rotational speed of second motor generator MG2 does not decrease largely as in FIG. 8A. Further, since the torque of second motor generator MG2 can be controlled in this case, the drive wheels under the ABS control may be applied with a braking torque by means of first motor generator MG1. As shown in FIG. 10B, even while the drive wheels are locking, the rotational speed of each rotating element do not decrease to zero. When the hybrid electric vehicle stops in this state, engine E is not stalled since the rotational speed of engine E is not zero. As shown in the phases (5) and (6), even when the rotational speed of output shaft OUT fluctuates due to the ABS control, the range of fluctuations in the rotational speed of second motor generator MG2 is relatively small. This also reduces the range of fluctuations in the input/output electric power as shown in the phase (8). In this case, since DC/DC booster converter 13 is normal, it is possible to use the braking torque of second motor generator MG2. As a result, the wheel speed decreases quickly to cause decrease in the braking distance as shown in the phases (9) and (10).

After the process of the ABS control is completed, the mode shift from the variable speed ratio mode to the fixed speed ratio mode is inhibited for a predetermined period of time. This ensures that the running mode is shifted to the fixed speed ratio mode where the rotation speed of the drive wheels is stable.

The following describes a case in which the TCS is operating in the LOW mode. FIGS. 12A to 12C are views showing a process of change of the speed relationship of the vehicle drive control apparatus. FIGS. 13A to 13F are graphs showing a process of change of the rotational speed of each rotating element of the vehicle drive control apparatus and the input/output electric power of the motor generators and battery 4. In the phase (1) as shown in FIGS. 13A to 13F, the hybrid electric vehicle is running at a certain speed in the LOW mode in accordance with the speed relationship of FIG. 12A. In the phase (2), accelerator pedal operation of a driver induces a slip state of the drive wheels. In the phase (3), the wheel speed starts to rapidly increase, i.e. the output shaft speed starts to rapidly increase. At the time, the TCS control is activated to start a torque-down control of engine E. In the phases (4), (5), and (6), when the rotational speed of output shaft OUT increases, the rotational speed of second motor generator MG2 also rapidly increases as in FIG. 12B since the rotational speed of first motor generator MG1 is fixed to zero. Further, when the drive wheels are slipping due to an excessive driving torque, it is possible that the rotational speed of each rotating element excessively increases to adversely affect the durability of second motor generator MG2 and other rotating elements. When the output torque to the drive wheels is reduced by the TCS control as shown in the phases (7), (8), and (9), the drive wheels starts to grip again and thereby the rotational speed of the drive wheels decreases quickly. This causes a leveraged change in the rotational speed of second motor generator MG2 which is determined in accordance with the speed relationship of the vehicle drive control apparatus. As a result, the input/output electric power of battery 4 also fluctuates largely, to impose an excessive load on DC/DC booster converter 13, and thereby to adversely affect the durability of DC/DC booster converter 13.

The following describes a case in which the TCS starts to operate after shift from the LOW mode to the LOW-iVT mode. FIGS. 14A to 14C are views showing a process of change of the speed relationship of the vehicle drive control apparatus. FIGS. 15A to 15F are graphs showing a process of change of the rotational speed of each rotating element of the vehicle drive control apparatus and the input/output electric power of the motor generators and battery 4. In the phase (1) as shown in FIGS. 15A to 15F, the hybrid electric vehicle is running at a certain speed in the LOW mode in accordance with the speed relationship of FIG. 14A. In the phase (2), accelerator pedal operation of a driver induces a slip state of the drive wheels. In the phase (3), the wheel speed starts to rapidly increase, i.e. the output shaft speed starts to rapidly increase. At the time, the TCS control is activated. In this case, in parallel, in the phase (4), integrated controller 6 disengages HIGH/LOW-mode brake HLB to proceed into the LOW-iVT mode. Integrated controller 6 also performs a torque down control, i.e. controls the torque of first motor generator MG1 to reduce the torque of output shaft OUT. In this case, the rotational speed of first motor generator MG1 is allowed to increase as shown in FIG. 14B. As a result, even when the rotational speed of output shaft OUT increases, the rotational speed of second motor generator MG2 does not increase largely, as in FIG. 12A. As shown in the phases (5), (6), and (7), even when the rotational speed of output shaft OUT fluctuates due to the TCS control, the range of fluctuations in the rotational speed of second motor generator MG2 is relatively small. This also reduces the range of fluctuations in the input/output electric power. As shown in the phases (7), (8), (9), and (10), when the output torque of output shaft OUT for the drive wheels is reduced so that the drive wheels start to grip again, the rotational speed of output shaft OUT quickly decreases. However, as shown in the phase (11), since the range of fluctuations in the rotational speed of second motor generator MG2 is relatively small, DC/DC booster converter 13 is not applied with an excessive load. Even when a slip state of the drive wheels occurs, it is possible to prevent an excessive rational speed of second motor generator MG2, resulting in improvement of the durability.

In the case the TCS is operating in the LOW mode, first motor generator MG1 is fixed and the required change is allocated only to the rotational speed of second motor generator MG2. This large range of change of the rotational speed of second motor generator MG2 adversely affects the durability of DC/DC booster converter 13. On the other hand, the above-described mode shift to the LOW-iVT mode results in a small range of fluctuations in the rotational speed of first motor generator MG1 and second motor generator MG2, and thereby results in preventing that DC/DC booster converter 13 is applied with a large load. That is, it is possible to control or reduce or minimize the range of fluctuation in the rotational speed.

Further, first motor generator MG1 may be used for the torque down control in addition to the torque down control of engine E. As a result, the slip state of the drive wheels can be avoided quickly.

After the process of the TCS control is completed, the mode shift from the variable speed ratio mode to the fixed speed ratio mode is inhibited for a predetermined period of time. This ensures that the running mode is shifted to the fixed speed ratio mode where the rotational speed of the drive wheels is stable.

The following describes a case in which the ABS is operating in the 2ND mode. FIGS. 16A to 16C are views showing a process of change of the speed relationship of the vehicle drive control apparatus. FIGS. 17A to 17F are graphs showing a process of change of the rotational speed of each rotating element of the vehicle drive control apparatus and the input/output electric power of the motor generators and battery 4. This case is basically the same as the case where the ABS is operating in the LOW mode except the following. While in the case of the LOW mode first motor generator MG1 is fixed, second motor generator MG2 is fixed in the case of the 2ND mode. Since the rotational speed of first motor generator MG1 is increased with respect to the rotational speed of output shaft OUT, the change in the rotational speed of output shaft OUT causes a leveraged change in the rotational speed of first motor generator MG1, resulting in imposing a large load on DC/DC booster converter 13.

The following describes a case in which the ABS starts to operate after shift from the 2ND mode to the HIGH-iVT mode. FIGS. 18A to 18C are views showing a process of change of the speed relationship of the vehicle drive control apparatus. FIGS. 19A to 19F are graphs showing a process of change of the rotational speed of each rotating element of the vehicle drive control apparatus and the input/output electric power of the motor generators and battery 4. This case is basically the same as the case where the ABS starts to operate after shift from the LOW mode to the LOW-iVT mode except the following. While in the case of the LOW mode first motor generator MG1 is fixed, second motor generator MG2 is fixed in the case of the 2ND mode. The mode shift to the HIGH-iVT mode is established by disengaging LOW-mode brake LB, reducing the range of fluctuations in the rotational speeds. The operation effect in this case is basically the same as in the case of the LOW mode.

The following describes a case in which the TCS is operating in the 2ND mode. FIGS. 20A to 20C are views showing a process of change of the speed relationship of the vehicle drive control apparatus. FIGS. 21A to 21F are graphs showing a process of change of the rotational speed of each rotating element of the vehicle drive control apparatus and the input/output electric power of the motor generators and battery 4. This case is basically the same as the case where the TCS is operating in the LOW mode except the following. While in the case of the LOW mode first motor generator MG1 is fixed, second motor generator MG2 is fixed in the case of the 2ND mode. Since the rotational speed of first motor generator MG1 is increased with respect to the rotational speed of output shaft OUT, the change in the rotational speed of output shaft OUT causes a leveraged change in the rotational speed of first motor generator MG1, resulting in imposing a large load on DC/DC booster converter 13.

The following describes a case in which the TCS starts to operate after shift from the 2ND mode to the HIGH-iVT mode. FIGS. 22A to 22C are views showing a process of change of the speed relationship of the vehicle drive control apparatus. FIGS. 23A to 23F are graphs showing a process of change of the rotational speed of each rotating element of the vehicle drive control apparatus and the input/output electric power of the motor generators and battery 4. This case is basically the same as the case where the TCS starts to operate after shift from the LOW mode to the LOW-iVT mode except the following. While in the case of the LOW mode first motor generator MG1 is fixed, second motor generator MG2 is fixed in the case of the 2ND mode. The mode shift to the HIGH-iVT mode is established by disengaging LOW-mode brake LB, reducing the range of fluctuations in the rotational speeds. The operation effect in this case is basically the same as in the case of the LOW mode.

The following describes effects and advantages produced by the operation of the vehicle drive control apparatus of the first embodiment.

(1) A vehicle drive control apparatus for a wheeled vehicle including a first motor generator (MG1), and a second motor generator (MG2), the vehicle drive control apparatus comprising: a planetary gear set (PG1, PG2, PG3) including a first rotating element (R2) adapted to be drivingly connected to the first motor generator (MG1), a second rotating element (M1) adapted to be drivingly connected to the second motor generator (MG2), and a third rotating element (PC3) adapted to be drivingly connected to a drive wheel (OUT) of the vehicle; a rotation control mechanism (HLB; LB) adapted selectively to restrict rotation of one of the first and second rotating elements (R2; M1) of the planetary gear set (PG1, PG2, PG3) to establish a fixed speed ratio mode (LOW; 2ND; HIGH), and to release the one of the first and second rotating elements (R2; M1) to establish a variable speed ratio mode (LOW-iVT; HIGH-iVT); a wheel slip detector (20) configured to detect a slip state of the drive wheel (OUT) with respect to a road surface; and a control unit (6) configured to control each operating state of the rotation control mechanism (HLB; LB), the first motor generator (MG1), and the second motor generator (MG2), the control unit (6) being configured to establish the variable speed ratio mode (LOW-iVT; HIGH-iVT) when the slip state of the drive wheel (OUT) is detected in the fixed speed ratio mode (LOW; 2ND), is effective for reducing or minimizing the range of fluctuations in the rotational speed of first motor generator MG1 and second motor generator MG2 even when the ABS control or TCS control is activated to control the slip state of the wheels.

(2) The vehicle drive control apparatus wherein the wheel slip detector (20) is configured to detect a braking slip state of the drive wheel (OUT) with respect to a road surface, and wherein the control unit (6) is configured to establish the variable speed ratio mode (LOW-iVT; HIGH-iVT) when the braking slip state of the drive wheel (OUT) is detected in the fixed speed ratio mode (LOW; 2ND), and configured to control the first and second motor generators (MG1, MG2) in such a manner to apply a braking effort to the drive wheel (OUT) in the established variable speed ratio mode (LOW-iVT; HIGH-iVT), is effective for shortening the braking distance.

(3) The vehicle drive control apparatus wherein the wheel slip detector (20) is configured to detect a driving slip state of the drive wheel (OUT) with respect to a road surface, and wherein the control unit (6) is configured to establish the variable speed ratio mode (LOW-iVT; HIGH-iVT) when the driving slip state of the drive wheel (OUT) is detected in the fixed speed ratio mode (LOW; 2ND), and configured to control the first and second motor generators (MG1, MG2) in such a manner to apply a driving effort to the drive wheel (OUT) in the established variable speed ratio mode (LOW-iVT; HIGH-iVT), is effective for performing a torque down control quickly, and thereby for enhancing the performance of the TCS control.

(4) The vehicle drive control apparatus further comprising a wheel slip controller (20) configured to control the slip state of the drive wheel (OUT) in accordance with a desired slip state when the slip state of the drive wheel (OUT) is detected, wherein the control unit (6) is configured to inhibit establishment of the fixed speed ratio mode (LOW; 2ND) for a predetermined period of time after a control process (process of the ABS control or TCS control) of the wheel slip controller (20) is completed in the established variable speed ratio mode (LOW-iVT; HIGH-iVT), is effective for allowing that the hybrid electric vehicle runs in the variable speed ratio mode in the situation where the vehicle speed does not corresponding to the wheel speeds, and thereby for stably performing the ABS or TCS control, preventing that unexpected fluctuations in the rotational speeds cause a large amount of fluctuations in the rotational speed of the motor generators.

Although the vehicle drive control apparatus of the first embodiment includes a differential gear unit comprising three single pinion type simple planetary gears in which a parallel running mode and a series running mode can be selected, the differential gear unit may comprise such a Ravigneaux type planetary gear as shown in Japanese Published Patent Application No. 2003-32808 in which a parallel running mode and a series running mode can be selected. The vehicle drive control apparatus of the first embodiment may be adapted for a hybrid electric vehicle of a series type that has only a series running mode. Further, the vehicle drive control apparatus of the first embodiment may be adapted for an electric vehicle which does not carry an engine.

Although the foregoing describes the cases where the change in the rotational speed of the motor generators is generally leveraged larger due to slip states of the drive wheels in the LOW mode or 2ND mode, the vehicle drive control apparatus may be configured in such a manner that when a process of the ABS control or TCS control is activated in the HIGH mode, the running mode is shifted to the HIGH-iVT mode.

This application is based on a prior Japanese Patent Application No. 2005-164836 filed on Jun. 3, 2005. The entire contents of this Japanese Patent Application No. 2005-164836 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle drive control apparatus for a wheeled vehicle including a first motor generator and a second motor generator, the vehicle drive control apparatus comprising:
   a planetary gear set including a first rotating element drivingly connected to the first motor generator, a second rotating element drivingly connected to the second motor generator, and a third rotating element drivingly connected to a drive wheel of the vehicle;
   a rotation control mechanism selectively restricting rotation of one of the first and second rotating elements of the planetary gear set to establish a fixed speed ratio mode, and releasing the one of the first and second rotating elements to establish a variable speed ratio mode;
   a wheel slip detector configured to detect a slip state of the drive wheel with respect to a road surface; and
   a control unit configured to control each operating state of the rotation control mechanism, the first motor generator, and the second motor generator, the control unit being configured to establish the variable speed ratio mode when the slip state of the drive wheel is detected in the fixed speed ratio mode,
   wherein the vehicle includes an engine,
   wherein the planetary gear set includes a fourth rotating element drivingly connected to the engine,
   wherein a speed ratio of the third rotating element of the planetary gear set to the fourth rotating element of the planetary gear set is fixed in the fixed speed ratio mode, and
   wherein the speed ratio is allowed to vary in the variable speed ratio mode.

2. A vehicle drive control apparatus for a wheeled vehicle including a first motor generator and a second motor generator, the vehicle drive control apparatus comprising:
   a planetary gear set including a first rotating element drivingly connected to the first motor generator, a second rotating element drivingly connected to the second motor generator, and a third rotating element drivingly connected to a drive wheel of the vehicle;
   a rotation control mechanism selectively restricting rotation of one of the first and second rotating elements of the planetary gear set to establish a fixed speed ratio mode, and releasing the one of the first and second rotating elements to establish a variable speed ratio mode;
   a wheel slip detector configured to detect a slip state of the drive wheel with respect to a road surface; and
   a control unit configured to control each operating state of the rotation control mechanism, the first motor generator, and the second motor generator, the control unit being configured to establish the variable speed ratio mode when the slip state of the drive wheel is detected in the fixed speed ratio mode,
   wherein the wheel slip detector is configured to detect a braking slip state of the drive wheel with respect to the road surface, and
   wherein the control unit is configured to establish the variable speed ratio mode when the braking slip state of the drive wheel is detected in the fixed speed ratio mode, and configured to control the first and second motor generators in such a manner to apply a braking effort to the drive wheel in the established variable speed ratio mode.

3. A vehicle drive control apparatus for a wheeled vehicle including a first motor generator and a second motor generator, the vehicle drive control apparatus comprising:
   a planetary gear set including a first rotating element drivingly connected to the first motor generator, a second rotating element drivingly connected to the second motor generator, and a third rotating element drivingly connected to a drive wheel of the vehicle;
   a rotation control mechanism selectively restricting rotation of one of the first and second rotating elements of the planetary gear set to establish a fixed speed ratio mode, and releasing the one of the first and second rotating elements to establish a variable speed ratio mode;
   a wheel slip detector configured to detect a slip state of the drive wheel with respect to a road surface; and
   a control unit configured to control each operating state of the rotation control mechanism, the first motor generator, and the second motor generator, the control unit being configured to establish the variable speed ratio mode when the slip state of the drive wheel is detected in the fixed speed ratio mode,
   wherein the wheel slip detector is configured to detect a driving slip state of the drive wheel with respect to the road surface, and
   wherein the control unit is configured to establish the variable speed ratio mode when the driving slip state of the drive wheel is detected in the fixed speed ratio mode, and configured to control the first and second motor generators in such a manner to apply a driving effort to the drive wheel in the established variable speed ratio mode.

4. A vehicle drive control apparatus for a wheeled vehicle including a first motor generator and a second motor generator, the vehicle drive control apparatus comprising:
   a planetary gear set including a first rotating element drivingly connected to the first motor generator, a second rotating element drivingly connected to the second motor generator, and a third rotating element drivingly connected to a drive wheel of the vehicle;
   a rotation control mechanism selectively restricting rotation of one of the first and second rotating elements of the planetary gear set to establish a fixed speed ratio mode, and releasing the one of the first and second rotating elements to establish a variable speed ratio mode;
   a wheel slip detector configured to detect a slip state of the drive wheel with respect to a road surface;
   a control unit configured to control each operating state of the rotation control mechanism, the first motor generator, and the second motor generator, the control unit being configured to establish the variable speed ratio mode when the slip state of the drive wheel is detected in the fixed speed ratio mode; and
   a wheel slip controller configured to control the slip state of the drive wheel in accordance with a desired slip state when the slip state of the drive wheel is detected,
   wherein the control unit is configured to inhibit establishment of the fixed speed ratio mode for a predetermined period of time after a control process of the wheel slip controller is completed in the established variable speed ratio mode.

5. A vehicle drive control apparatus for a wheeled vehicle including an engine, a first motor generator, and a second motor generator, the vehicle drive control apparatus comprising:
- a case;
- a first single-pinion planetary gear comprising a first sun gear, a first planet-pinion carrier, and a first ring gear;
- a second single-pinion planetary gear comprising a second sun gear, a second planet-pinion carrier, and a second ring gear;
- a third single-pinion planetary gear comprising a third sun gear, a third planet-pinion carrier, and a third ring gear, the third planet-pinion carrier being drivingly connected to a drive wheel of the vehicle;
- a first rotating member coupling the first sun gear and the second sun gear, the first rotating member being drivingly connected to the second motor generator;
- a second rotating member coupling the first ring gear and the third sun gear;
- a third rotating member coupling the second planet-pinion carrier and the third ring gear;
- a first clutch selectively and drivingly connecting and disconnecting the engine and the first motor generator;
- a second clutch selectively and drivingly connecting and disconnecting the second ring gear and the first motor generator;
- a third clutch selectively and drivingly connecting and disconnecting the first planet-pinion carrier and the second motor generator;
- a fourth clutch selectively and drivingly connecting and disconnecting the third rotating member and the engine;
- a first brake selectively and drivingly connecting and disconnecting the second ring gear and the case;
- a second brake selectively and drivingly connecting and disconnecting the first planet-pinion carrier and the case;
- a wheel slip detector configured to detect a slip state of the drive wheel with respect to a road surface; and
- a control unit configured to control each operating state of the first, second, third, and fourth clutches, the first and second brakes, and the first and second motor generators to establish at least a fixed speed ratio mode in which a speed ratio of the third planet-pinion carrier to the third rotating member is fixed and at least a variable speed ratio mode in which the speed ratio is allowed to vary, the control unit being configured to establish the at least variable speed ratio mode when the slip state of the drive wheel is detected in the at least fixed speed ratio mode.

6. The vehicle drive control apparatus as claimed in claim 5, wherein a first fixed speed ratio mode is established by disengaging the first clutch, engaging the second clutch, disengaging the third clutch, disengaging the fourth clutch, engaging the first brake, and engaging the second brake, and
- wherein the control unit is configured to establish a first variable speed ratio mode by disengaging the first brake when the slip state of the drive wheel is detected in the first fixed speed ratio mode.

7. The vehicle drive control apparatus as claimed in claim 5, wherein a second fixed speed ratio mode is established by disengaging the first clutch, engaging the second clutch, engaging the third clutch, disengaging the fourth clutch, disengaging the first brake, and engaging the second brake, and
- wherein the control unit is configured to establish a second variable speed ratio mode by disengaging the second brake when the slip state of the drive wheel is detected in the second fixed speed ratio mode.

8. The vehicle drive control apparatus as claimed in claim 5, wherein a third fixed speed ratio mode is established by disengaging the first clutch, engaging the second clutch, disengaging the third clutch, engaging the fourth clutch, engaging the first brake, and engaging the second brake, and
- wherein the control unit is configured to establish a third variable speed ratio mode by disengaging the first brake when the slip state of the drive wheel is detected in the third fixed speed ratio mode.

9. The vehicle drive control apparatus as claimed in claim 5, wherein a fourth fixed speed ratio mode is established by disengaging the first clutch, engaging the second clutch, engaging the third clutch, engaging the fourth clutch, disengaging the first brake, and engaging the second brake, and
- wherein the control unit is configured to establish a fourth variable speed ratio mode by disengaging the second brake when the slip state of the drive wheel is detected in the fourth fixed speed ratio mode.

* * * * *